United States Patent
Lee et al.

(10) Patent No.: US 11,503,634 B2
(45) Date of Patent: Nov. 15, 2022

(54) METHOD AND APPARATUS FOR SUPPORTING RACH-LESS MOBILITY WITH PRE-ALLOCATED BEAMS IN WIRELESS COMMUNICATION SYSTEM

(71) Applicant: LG ELECTRONICS INC., Seoul (KR)

(72) Inventors: Youngdae Lee, Seoul (KR); Yejee Lee, Seoul (KR); Sunyoung Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 83 days.

(21) Appl. No.: 16/769,995

(22) PCT Filed: Feb. 14, 2019

(86) PCT No.: PCT/KR2019/001791
§ 371 (c)(1),
(2) Date: Jun. 4, 2020

(87) PCT Pub. No.: WO2019/160342
PCT Pub. Date: Aug. 22, 2019

(65) Prior Publication Data
US 2020/0389886 A1    Dec. 10, 2020

Related U.S. Application Data

(60) Provisional application No. 62/630,272, filed on Feb. 14, 2018.

(51) Int. Cl.
*H04W 74/02* (2009.01)
*H04W 36/00* (2009.01)
(Continued)

(52) U.S. Cl.
CPC ....... *H04W 74/02* (2013.01); *H04W 36/0072* (2013.01); *H04W 36/023* (2013.01);
(Continued)

(58) Field of Classification Search
CPC .............. H04W 72/0413; H04W 8/26; H04W 36/0072; H04W 36/023; H04W 72/042;
(Continued)

(56) References Cited

U.S. PATENT DOCUMENTS 8,194,694 B2    6/2012  Kato et al.
2015/0105084 A1*  4/2015  Bontu ............... H04W 56/0045
                                                                455/437

(Continued)

FOREIGN PATENT DOCUMENTS

WO    2015/117275 A1    8/2015
WO    2017/191919 A1    11/2017

OTHER PUBLICATIONS

Section 10.1.2.1 of 3GPP TS 36.300 V15.0.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description", Stage 2, (Release 15), (Dec. 2017).

(Continued)

*Primary Examiner* — Shailendra Kumar
(74) *Attorney, Agent, or Firm* — Dentons US LLP

(57) ABSTRACT

A method and apparatus for supporting a random access channel (RACH)-less mobility with pre-allocated beams in a wireless communication system is provided. A user equipment (UE) receives a mobility command message which includes information on a pre-allocated UL resource for UL transmission with pre-allocated beams, synchronizes to a target cell, and performs the UL transmission to the target cell via the pre-allocated beams based on the pre-allocated UL resource for UL transmission to transmit a mobility complete message via a UL grant. If the UL transmission fails, the UE may perform RACH procedure.

15 Claims, 16 Drawing Sheets

(51) Int. Cl.

| | |
|---|---|
| *H04W 36/02* | (2009.01) |
| *H04W 72/04* | (2009.01) |
| *H04W 72/14* | (2009.01) |
| *H04W 74/04* | (2009.01) |
| *H04W 74/08* | (2009.01) |
| *H04W 76/27* | (2018.01) |
| *H04L 5/00* | (2006.01) |
| *H04W 8/26* | (2009.01) |

(52) U.S. Cl.
CPC ..... *H04W 72/042* (2013.01); *H04W 72/0413* (2013.01); *H04W 72/14* (2013.01); *H04W 74/04* (2013.01); *H04W 74/0808* (2013.01); *H04W 74/0833* (2013.01); *H04W 76/27* (2018.02); *H04L 5/005* (2013.01); *H04W 8/26* (2013.01)

(58) Field of Classification Search
CPC .... H04W 72/14; H04W 74/0833; H04L 5/005
See application file for complete search history.

(56) References Cited

U.S. PATENT DOCUMENTS

| | | |
|---|---|---|
| 2015/0319774 A1 | 11/2015 | Cai et al. |
| 2017/0041841 A1* | 2/2017 | Pedersen ........... H04W 36/0094 |
| 2017/0331670 A1* | 11/2017 | Parkvall ............... H04J 11/0079 |
| 2019/0052435 A1 | 2/2019 | Martin et al. |
| 2019/0110300 A1* | 4/2019 | Chen .................. H04W 72/042 |
| 2019/0141783 A1* | 5/2019 | Malik ................ H04W 72/0453 |
| 2019/0166553 A1 | 5/2019 | Ryoo et al. |
| 2019/0200248 A1* | 6/2019 | Basu Mallick ...... H04B 7/0695 |
| 2019/0246442 A1 | 8/2019 | Park et al. |
| 2019/0253941 A1 | 8/2019 | Cirik et al. |
| 2021/0112598 A1 | 4/2021 | Ryu et al. |

OTHER PUBLICATIONS

Section 5.3.1.3 of 3GPP TS 36.331 V15.0.1, "3rd Generation Partnership Project; Technical Specification Group Radio Access Network; Evolved Universal Terrestrial Radio Access (E-UTRA); Radio Resource Control (RRC); Protocol specification", (Release 15), (Jan. 2018).

Section 5.3.5 of 3GPP TS 36.331 V15.0.1, "3rd Generation Partnership Project; Technical Specification Group Radio Access Network; Evolved Universal Terrestrial Radio Access (E-UTRA); Radio Resource Control (RRC); Protocol specification", (Release 15), (Jan. 2018).

Section 5.3.10.10 of 3GPP TS 36.331 V15.0.1, "3rd Generation Partnership Project; Technical Specification Group Radio Access Network; Evolved Universal Terrestrial Radio Access (E-UTRA); Radio Resource Control (RRC) Protocol specification", (Release 15), (Jan. 2018).

Section 5.3.1 of 3GPP TS 36.321 V15.0.0, "3rd Generation Partnership Project; Technical Specification Group Radio Access Network; Evolved Universal Terrestrial Radio Access (E-UTRA); Medium Access Control (MAC) protocol specification", (Release 15), (Dec. 2017).

Section 9.2.3 of 3GPP TS 38.300 V15.0.0, "3rd Generation Partnership Project; Technical Specification Group Radio Access Network; NR; NR and NG-RAN Overall Description", Stage 2, (Release 15), (Dec. 2017).

* cited by examiner

METHOD AND APPARATUS FOR SUPPORTING RACH-LESS MOBILITY WITH PRE-ALLOCATED BEAMS IN WIRELESS COMMUNICATION SYSTEM

This application is the National Stage filing under 35 U.S.C. 371 of International Application No. PCT/KR2019/001791, filed on Feb. 14, 2019, which claims the benefit of U.S. Provisional Application No. 62/630,272 filed on Feb. 14, 2018, the contents of which are all hereby incorporated by reference herein in their entirety.

TECHNICAL FIELD

The present invention relates to wireless communications, and more particularly, to a method and apparatus for supporting a random access channel (RACH)-less mobility with pre-allocated beams in a wireless communication system.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

In LTE, random access channel (RACH)-less handover is introduced for reducing handover latency. When the source cell decides to handover and the target cell is time synchronized, the target cell can provide predefined uplink grant information to the source cell. Then, the source cell sends the grants to the user equipment (UE) and the UE can perform handover by using the received grants without RACH.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

SUMMARY

In NR, beam forming and high frequency are considered. In NR, the RACH procedure is used not only for the time synchronization but also for beam management. Indices of time/frequency random access resources are associated to corresponding beams. If preamble index is associated to corresponding Msg2 downlink transmission beam respectively, the target gNB could find suitable beam for the UE from the received preamble index.

The UE can also include beam index of target cell in the measurement result. So, if the source gNB sends handover request with the beam result to the target gNB, the target gNB could allocate uplink resource associated to corresponding reported beam in advance. However, if the UE moves fast or the beam is narrow, the received pre-allocated resource would be outdated.

In an aspect, a method performed by a user equipment (UE) in a wireless communication system is provided. The method includes receiving a mobility command message which includes information on a pre-allocated UL resource for UL transmission with pre-allocated beams, synchronizing to a target cell, and performing the UL transmission to the target cell via the pre-allocated beams based on the pre-allocated UL resource for UL transmission to transmit a mobility complete message via a UL grant.

In another aspect, a user equipment (UE) in a wireless communication system is provided. The UE includes a memory, a transceiver, and a processor, operably couple to the memory and the transceiver, and configured for receiving a mobility command message which includes information on a pre-allocated UL resource for UL transmission with pre-allocated beams, synchronizing to a target cell, and performing the UL transmission to the target cell via the pre-allocated beams based on the pre-allocated UL resource for UL transmission to transmit a mobility complete message via a UL grant.

Frequent handover failure can be avoided.

DETAILED DESCRIPTION

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (DL). For example, only OFDMA may be used for DL and only SC-FDMA may be used for UL. Alternatively, OFDMA and SC-FDMA may be used for DL and/or UL.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A, B, C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

Figure 1:
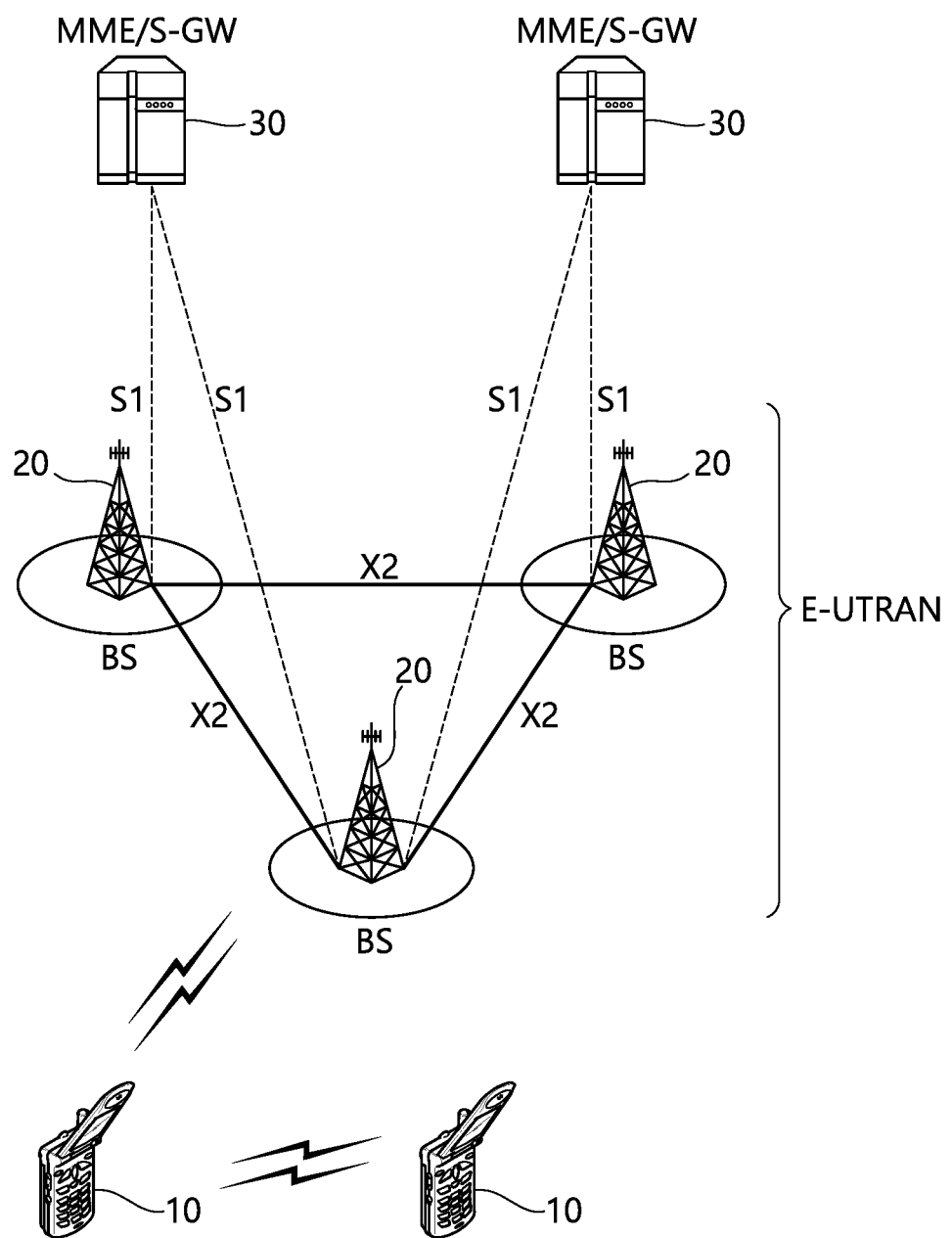
FIG. 1 shows an example of a wireless communication system to which technical features of the present invention can be applied.

FIG. 1 shows an example of a wireless communication system to which technical features of the present invention can be applied. Specifically, FIG. 1 shows a system architecture based on an evolved-UMTS terrestrial radio access network (E-UTRAN). The aforementioned LTE is a part of an evolved-UTMS (e-UMTS) using the E-UTRAN.

Referring to FIG. 1, the wireless communication system includes one or more user equipment (UE; 10), an E-UTRAN and an evolved packet core (EPC). The UE 10 refers to a communication equipment carried by a user. The UE 10 may be fixed or mobile. The UE 10 may be referred to as another terminology, such as a mobile station (MS), a user terminal (UT), a subscriber station (SS), a wireless device, etc.

The E-UTRAN consists of one or more base station (BS) 20. The BS 20 provides the E-UTRA user plane and control plane protocol terminations towards the UE 10. The BS 20 is generally a fixed station that communicates with the UE 10. The BS 20 hosts the functions, such as inter-cell radio resource management (MME), radio bearer (RB) control, connection mobility control, radio admission control, measurement configuration/provision, dynamic resource allocation (scheduler), etc. The BS may be referred to as another terminology, such as an evolved NodeB (eNB), a base transceiver system (BTS), an access point (AP), etc.

A downlink (DL) denotes communication from the BS 20 to the UE 10. An uplink (UL) denotes communication from the UE 10 to the BS 20. A sidelink (SL) denotes communication between the UEs 10. In the DL, a transmitter may be a part of the BS 20, and a receiver may be a part of the UE 10. In the UL, the transmitter may be a part of the UE 10, and the receiver may be a part of the BS 20. In the SL, the transmitter and receiver may be a part of the UE 10.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 30 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 10 is connected to the BS 20 by means of the Uu interface. The UEs 10 are interconnected with each other by means of the PC5 interface. The BSs 20 are interconnected with each other by means of the X2 interface. The BSs 20 are also connected by means of the S1 interface to the EPC, more specifically to the MME by means of the S1-MME interface and to the S-GW by means of the S1-U interface. The S1 interface supports a many-to-many relation between MMEs/S-GWs and BSs.

Figure 2:
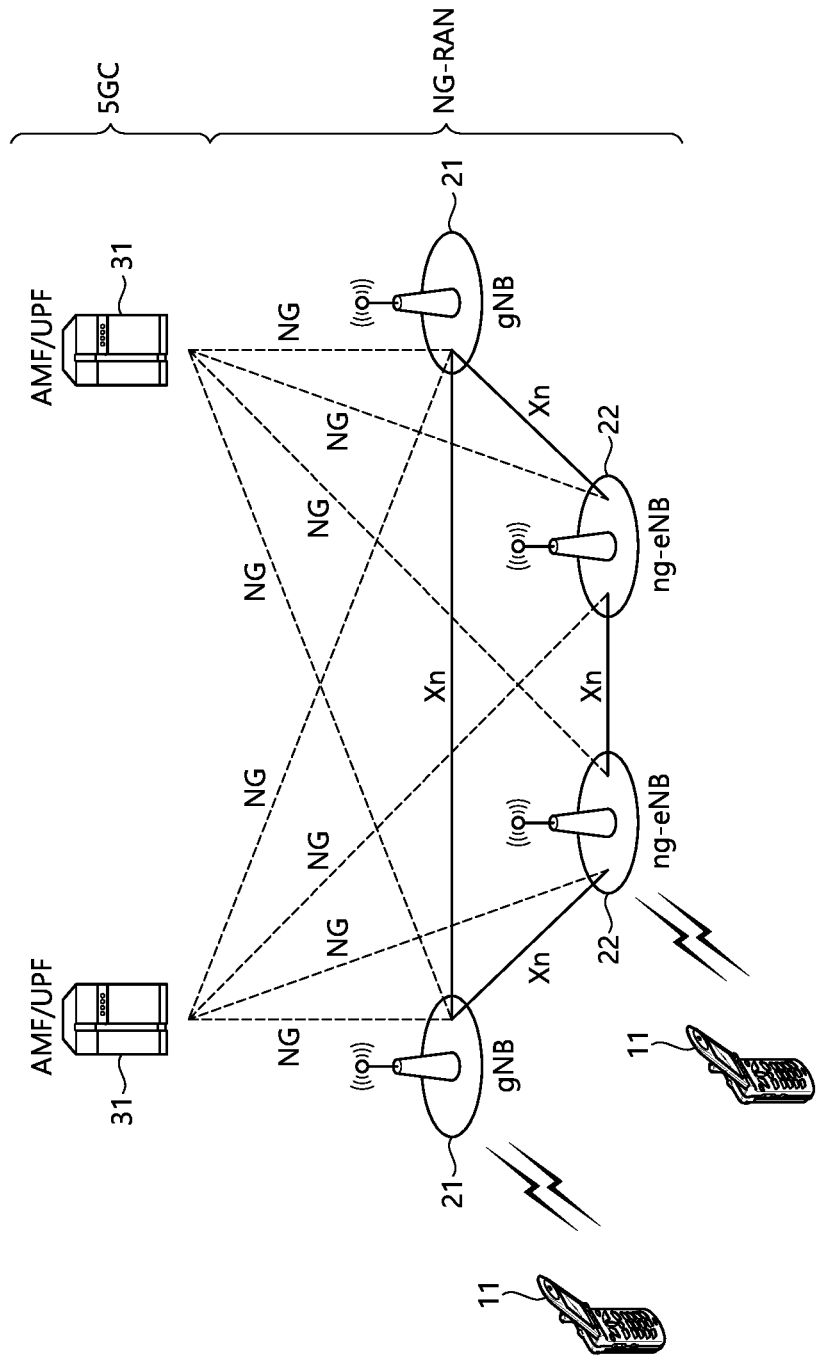
FIG. 2 shows another example of a wireless communication system to which technical features of the present invention can be applied.

FIG. 2 shows another example of a wireless communication system to which technical features of the present invention can be applied. Specifically, FIG. 2 shows a system architecture based on a 5G new radio access technology (NR) system. The entity used in the 5G NR system (hereinafter, simply referred to as "NR") may absorb some or all of the functions of the entities introduced in FIG. 1 (e.g. eNB, MME, S-GW). The entity used in the NR system may be identified by the name "NG" for distinction from the LTE/LTE-A.

Referring to FIG. 2, the wireless communication system includes one or more UE 11, a next-generation RAN (NG-RAN) and a 5th generation core network (5GC). The NG-RAN consists of at least one NG-RAN node. The NG-RAN node is an entity corresponding to the BS 10 shown in FIG. 1. The NG-RAN node consists of at least one gNB 21 and/or at least one ng-eNB 22. The gNB 21 provides NR user plane and control plane protocol terminations towards the UE 11. The ng-eNB 22 provides E-UTRA user plane and control plane protocol terminations towards the UE 11.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs and ng-eNBs are interconnected with each other by means of the Xn interface. The gNBs and ng-eNBs are also connected by means of the NG interfaces to the 5GC, more specifically to the AMF by means of the NG-C interface and to the UPF by means of the NG-U interface.

A protocol structure between network entities described above is described. On the system of FIG. 1 and/or FIG. 2, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 3:
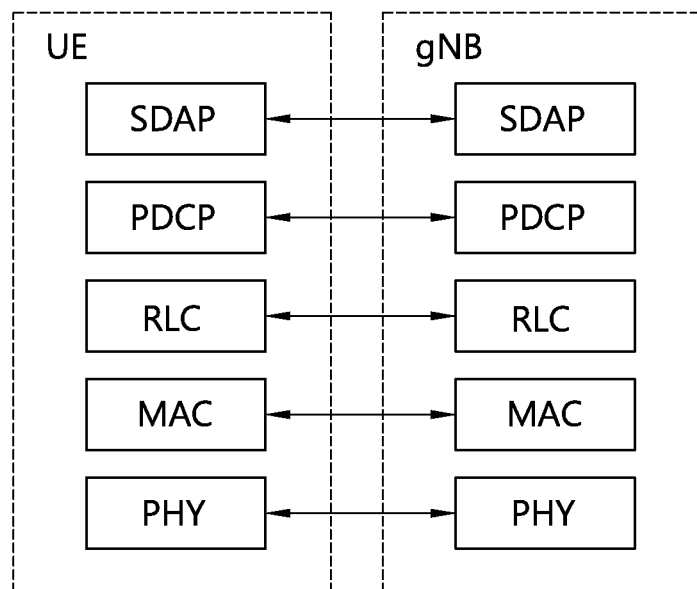
FIG. 3 shows a block diagram of a user plane protocol stack to which technical features of the present invention can be applied.
Figure 4:
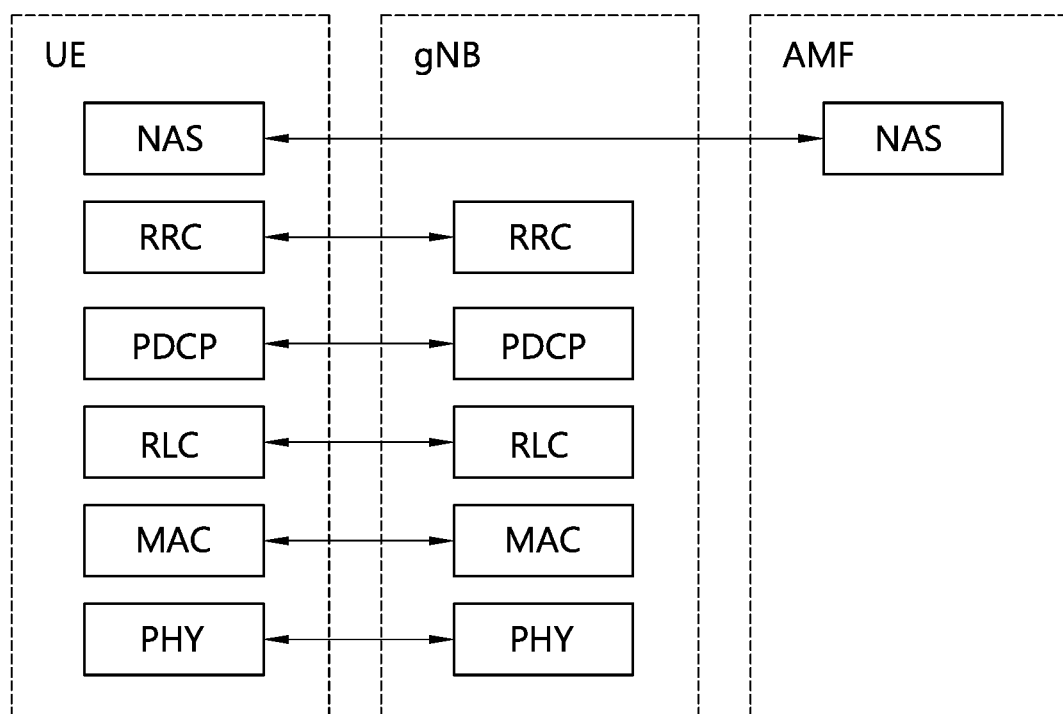
FIG. 4 shows a block diagram of a control plane protocol stack to which technical features of the present invention can be applied.

FIG. 3 shows a block diagram of a user plane protocol stack to which technical features of the present invention can be applied. FIG. 4 shows a block diagram of a control plane protocol stack to which technical features of the present invention can be applied. The user/control plane protocol stacks shown in FIG. 3 and FIG. 4 are used in NR. However, user/control plane protocol stacks shown in FIG. 3 and FIG. 4 may be used in LTE/LTE-A without loss of generality, by replacing gNB/AMF with eNB/MME.

Referring to FIG. 3 and FIG. 4, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/de-multiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

Random access channel (RACH)-less handover (HO) is described. One of the main purposes of RACH procedure during HO is to obtain target cell timing advance (TA). In absence of RACH procedure, the UE may be able to obtain the target cell TA without explicit TA command when the source cell and the target cell are time synchronized.

Figure 5:
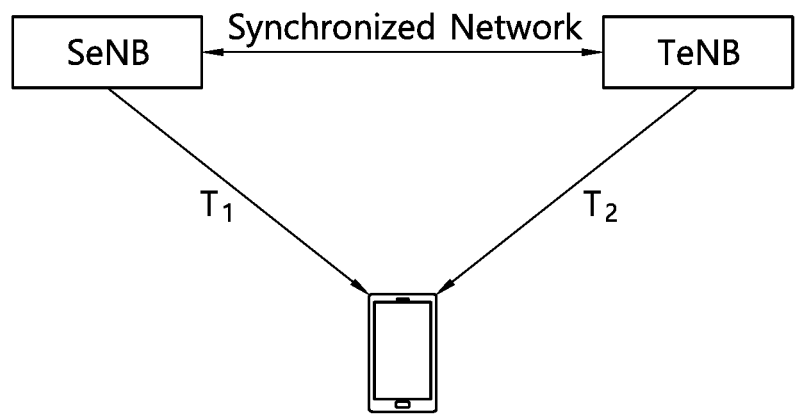
FIG. 5 shows obtaining target cell TA.

FIG. 5 shows obtaining target cell TA. Referring to FIG. 5, the UE first obtains the DL propagation delay difference between the source cell and the target cell (i.e. $T_1-T_2$). Assuming the UL propagation delay is the same as the DL propagation delay, the UE can derive the target cell TA from the source cell TA by Equation 1.

$$TA_{target} = TA_{source} - 2(T_1 - T_2) \quad \text{[Equation 1]}$$

Another purpose of RACH procedure during HO is to obtain UL grant for the transmission of the HO command response (i.e. RRC Connection Reconfiguration Complete message). In absence of RACH procedure in target BS, allocation of UL grant is needed in the target cell. One option is UL grant pre-allocation in HO command. The pre-allocated UL grant can be kept valid within a period of time, starting from the time when the UE achieves synchronization with the target cell. Another option is UL grant allocation by dynamic scheduling in the target cell. The target cell allocates UL grant to the UE by dynamic scheduling from the time when it expects the UE to be available for scheduling (e.g. based on mutually agreed time, or sometime later after the HO preparation procedure which is subject to BS implementation).

The initial value of PUSCH transmission power control is based on PRACH preamble power and total power ramp. If PRACH procedure is removed, power control in PUSCH should be modified.

HO procedure in 3GPP LTE/LTE-A is described. It may be referred to Section 10.1.2.1 of 3GPP TS 36.300 V15.0.0 (2017 December). The intra E-UTRAN HO of a UE in RRC_CONNECTED state is a UE-assisted network-controlled HO, with HO preparation signaling in E-UTRAN.

Part of the HO command comes from the target eNB and is transparently forwarded to the UE by the source eNB. To prepare the HO, the source eNB passes all necessary information to the target eNB (e.g. E-UTRAN radio access bearer (E-RAB) attributes and RRC context). When carrier aggregation (CA) is configured and to enable secondary cell (SCell) selection in the target eNB, the source eNB can provide in decreasing order of radio quality a list of the best cells and optionally measurement result of the cells. When dual connectivity (DC) is configured, the source master eNB (MeNB) provides the secondary cell group (SCG) configuration (in addition to the master cell group (MCG) configuration) to the target MeNB. Both the source eNB and UE keep some context (e.g. cell radio network temporary identity (C-RNTI)) to enable the return of the UE in case of HO failure. If RACH-less HO is not configured, the UE accesses the target cell via RACH following a contention-free procedure using a dedicated RACH preamble or following a contention-based procedure if dedicated RACH preambles are not available. The UE uses the dedicated preamble until the HO procedure is finished (successfully or unsuccessfully). If RACH-less HO is configured, the UE accesses the target cell via the UL grant pre-allocated to the UE in the RRC message. If the UE does not receive the pre-allocated UL grant in the RRC message from the source eNB, the UE monitors the PDCCH of the target cell. If the access towards the target cell (using RACH or RACH-less procedure) is not successful within a certain time, the UE initiates radio link failure (RLF) recovery using a suitable cell. No robust header compression (ROHC) context is transferred at HO. ROHC context can be kept at HO within the same eNB.

Figure 6:
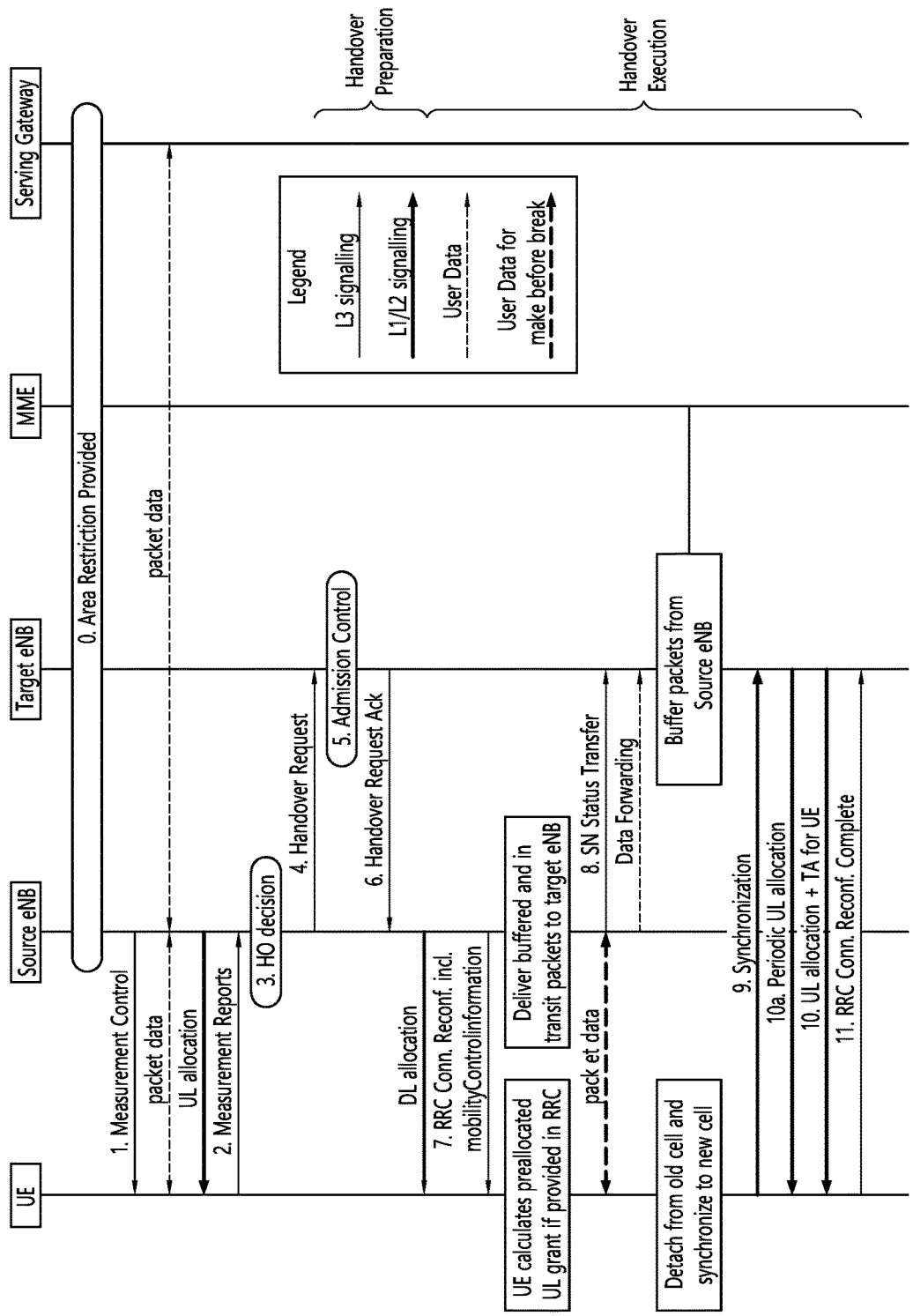
FIG. 6 shows intra-MME/S-GW HO.

FIG. 6 shows intra-MME/S-GW HO. FIG. 6 describes control plane (C-plane) handling in intra-MME/S-GW HO. The preparation and execution phase of the HO procedure is performed without EPC involvement, i.e. preparation messages are directly exchanged between the eNBs. The release of the resources at the source side during the HO completion phase is triggered by the eNB. FIG. 6 only shows HO preparation and execution phases, but does not show HO completion phase. Below is a more detailed description of the intra-MME/S-GW HO.

Steps 0 to 6 correspond to the HO preparation phase.

Step 0: The UE context within the source eNB contains information regarding roaming and access restrictions which were provided either at connection establishment or at the last TA update.

Step 1: The source eNB configures the UE measurement procedures according to the roaming and access restriction information and e.g. the available multiple frequency band information. Measurements provided by the source eNB may assist the function controlling the UE's connection mobility.

Step 2: A MEASUREMENT REPORT is triggered and sent to the eNB.

Step 3: The source eNB makes decision based on MEASUREMENT REPORT and radio resource management (RRM) information to hand off the UE.

Step 4: The source eNB issues a HANDOVER REQUEST message to the target eNB passing necessary information to prepare the HO at the target side (UE X2 signalling context reference at source eNB, UE S1 EPC signalling context reference, target cell ID, $K_{eNB}$*, RRC context including the C-RNTI of the UE in the source eNB, AS-configuration, E-RAB context and physical layer ID of the source cell+short MAC-I for possible RLF recovery). UE X2/UE S1 signalling references enable the target eNB to address the source eNB and the EPC. The E-RAB context includes necessary radio network layer (RNL) and transport network layer (TNL) addressing information, and quality of service (QoS) profiles of the E-RABs.

Step 5: Admission control may be performed by the target eNB dependent on the received E-RAB QoS information to increase the likelihood of a successful HO, if the resources can be granted by target eNB. The target eNB configures the required resources according to the received E-RAB QoS information and reserves a C-RNTI and optionally a RACH preamble. The AS-configuration to be used in the target cell can either be specified independently (i.e. an "establishment") or as a delta compared to the AS-configuration used in the source cell (i.e. a "reconfiguration").

Step 6: The target eNB prepares HO with L1/L2 and sends the HANDOVER REQUEST ACKNOWLEDGE message to the source eNB. The HANDOVER REQUEST ACKNOWLEDGE message includes a transparent container to be sent to the UE as an RRC message to perform the HO. The container includes a new C-RNTI, target eNB security algorithm identifiers for the selected security algorithms, may include a dedicated RACH preamble, and possibly some other parameters i.e. access parameters, system information blocks (SIBs), etc. If RACH-less HO is configured, the container includes timing adjustment indication and optionally a pre-allocated UL grant. The HANDOVER REQUEST ACKNOWLEDGE message may also include RNL/TNL information for the forwarding tunnels, if necessary.

As soon as the source eNB receives the HANDOVER REQUEST ACKNOWLEDGE, or as soon as the transmission of the HO command is initiated in the DL, data forwarding may be initiated.

Steps 7 to 11 correspond to the HO execution phase. Steps 7 to 11 and the HO completion phase (not shown) provide means to avoid data loss during HO.

Step 7: The target eNB generates the RRC message to perform the HO, i.e. RRCConnectionReconfiguration message including the mobilityControlInformation, to be sent by the source eNB towards the UE. The source eNB performs the necessary integrity protection and ciphering of the message.

The UE receives the RRCConnectionReconfiguration message with necessary parameters (i.e. new C-RNTI, target eNB security algorithm identifiers, and optionally dedicated RACH preamble, target eNB SIBs, etc.) and is commanded by the source eNB to perform the HO. If RACH-less HO is configured, the RRCConnectionReconfiguration includes timing adjustment indication and optionally pre-allocated UL grant for accessing the target eNB. If pre-allocated UL grant is not included, the UE should monitor PDCCH of the target eNB to receive a UL grant. The UE does not need to delay the HO execution for delivering the HARQ/ARQ responses to source eNB.

If Make-Before-Break HO is configured, the connection to the source cell is maintained after the reception of RRCConnectionReconfiguration message with mobilityControlInformation before the UE executes initial UL transmission to the target cell. If Make-Before-Break HO is configured, the source eNB decides when to stop transmitting to the UE. The UE can be configured with Make-Before-Break HO and RACH-less HO simultaneously.

Step 8: The source eNB sends the SN STATUS TRANSFER message to the target eNB to convey the UL PDCP sequence number (SN) receiver status and the DL PDCP SN transmitter status of E-RABs for which PDCP status preservation applies (i.e. for RLC acknowledged mode (AM)). The UL PDCP SN receiver status includes at least the PDCP SN of the first missing UL SDU and may include a bit map of the receive status of the out of sequence UL SDUs that the UE needs to retransmit in the target cell, if there are any such SDUs. The DL PDCP SN transmitter status indicates the next PDCP SN that the target eNB shall assign to new SDUs, not having a PDCP SN yet. The source eNB may omit sending this message if none of the E-RABs of the UE shall be treated with PDCP status preservation.

Step 9: If RACH-less HO is not configured, after receiving the RRCConnectionReconfiguration message including the mobilityControlInformation, UE performs synchronization to target eNB and accesses the target cell via RACH, following a contention-free procedure if a dedicated RACH preamble was indicated in the mobilityControlInformation, or following a contention-based procedure if no dedicated preamble was indicated. UE derives target eNB specific keys and configures the selected security algorithms to be used in the target cell.

If RACH-less HO is configured, UE performs synchronisation to target eNB. UE derives target eNB specific keys and configures the selected security algorithms to be used in the target cell.

Step 10: If RACH-less HO is not configured, the target eNB responds with UL allocation and timing advance.

Step 10a: If RACH-less HO is configured and the UE did not get the periodic pre-allocated UL grant in the RRCConnectionReconfiguration message including the mobilityControlInfo, the UE receives UL grant via the PDCCH of the target cell. The UE uses the first available UL grant after synchronization to the target cell.

Step 11: When the RACH-less HO is not configured and the UE has successfully accessed the target cell, the UE sends the RRCConnectionReconfigurationComplete message (C-RNTI) to confirm the HO, along with a UL buffer status report (BSR), whenever possible, to the target eNB, which indicates that the HO procedure is completed for the UE. The target eNB verifies the C-RNTI sent in the RRCConnectionReconfigurationComplete message. The target eNB can now begin sending data to the UE.

When the RACH-less HO is configured, after the UE has received UL grant, the UE sends the RRCConnectionReconfigurationComplete message (C-RNTI) to confirm the HO, along with an UL BSR, whenever possible, to the target eNB. The target eNB verifies the C-RNTI sent in the RRCConnectionReconfigurationComplete message. The target eNB can now begin sending data to the UE. The HO procedure is completed for the UE when the UE receives the UE contention resolution identity MAC control element (CE) from the target eNB.

Connected mode mobility is described. It may be referred to Section 5.3.1.3 of 3GPP TS 36.331 V15.0.1 (2017 December). An operation of UE in RRC_CONNECTED for mobility (e.g. HO) is described.

In RRC_CONNECTED, the network controls UE mobility, i.e. the network decides when the UE shall connect to which E-UTRA cell(s), or inter-RAT cell. For network controlled mobility in RRC_CONNECTED, the primary cell (PCell) can be changed using an RRCConnectionReconfiguration message including the mobilityControlInfo (HO), whereas the secondary cell(s) (SCell(s)) can be changed using the RRCConnectionReconfiguration message either with or without the mobilityControlInfo.

In DC, an SCG can be established, reconfigured or released by using an RRCConnectionReconfiguration message with or without the mobilityControlInfo. In case random access to the primary SCell (PSCell) or initial PUSCH transmission to the PSCell if rach-SkipSCG is configured is required upon SCG reconfiguration, E-UTRAN employs the SCG change procedure (i.e. an RRCConnectionReconfiguration message including the mobility ControlInfoSCG). The PSCell can only be changed using the SCG change procedure and by release and addition of the PSCell.

In E-UTRAN-NR DC (EN-DC), an SCG can be established or reconfigured by using an RRCConnectionReconfiguration message containing nr-secondaryCellGroupConfig.

The network triggers the HO procedure e.g. based on radio conditions, load. To facilitate this, the network may configure the UE to perform measurement reporting (possibly including the configuration of measurement gaps). The network may also initiate HO blindly, i.e. without having received measurement reports from the UE.

Before sending the HO message to the UE, the source eNB prepares one or more target cells. The source eNB selects the target PCell. The source eNB may also provide the target eNB with a list of best cells on each frequency for which measurement information is available, in order of decreasing reference signal received power (RSRP). The source eNB may also include available measurement information for the cells provided in the list. The target eNB decides which SCells are configured for use after HO, which may include cells other than the ones indicated by the source eNB. If an SCG is configured, HO involves either SCG release or SCG change. In case the UE was configured with (EN-) DC, the target eNB indicates in the HO message whether the UE shall release the entire (NR) SCG configuration. Upon connection re-establishment, the UE releases the entire SCG configuration except for the DRB configuration, while E-UTRAN in the first reconfiguration message following the re-establishment either releases the DRB(s) or reconfigures the DRB(s) to MCG DRB(s).

The target eNB generates the message used to perform the HO, i.e. the message including the AS-configuration to be used in the target cell(s). The source eNB transparently (i.e. does not alter values/content) forwards the HO message/information received from the target to the UE. When appropriate, the source eNB may initiate data forwarding for (a subset of) the DRBs.

After receiving the HO message, the UE attempts to access the target PCell at the first available RACH occasion according to random access resource selection, i.e. the HO is asynchronous, or at the first available PUSCH occasion if rach-Skip is configured. Consequently, when allocating a dedicated preamble for the random access in the target PCell, E-UTRA shall ensure it is available from the first RACH occasion the UE may use. The first available PUSCH occasion is provided by ul-ConfigInfo, if configured, otherwise UE shall monitor the PDCCH of target eNB. Upon successful completion of the HO, the UE sends a message used to confirm the HO.

The ul-ConfigInfo indicates the pre-allocated UL grant which is mentioned above.

When the prea-llocated UL grant is configured by RRC, the following information is provided in ul-ConfigInfo:
  UL scheduling interval ul-SchedInterval, starting subframe ul-StartSubframe of the pre-allocated UL grant, the UL grant ul-Grant and the number of HARQ process for the pre-allocated UL grant numberOfConfUL-Processes.

When the pre-allocated UL grant configuration is released by RRC, the corresponding pre-allocated UL grant shall be discarded.

If ul-ConfigInfo is configured, the MAC entity shall:
consider sequentially that the $N^{th}$ grant occurs in the subframe for which:

$$\text{subframe} = [N * ul\text{-SchedInterval} + ul\text{-StartSubframe}] \text{ modulo } 10.$$

For time division duplex (TDD), the MAC entity is configured with ul-SchedInterval shorter than 10 subframes, the $N^{th}$ grant shall be ignored if it occurs in a DL subframe or a special subframe.

Retransmission for UL transmissions using the pre-allocated UL grant can continue after clearing the pre-allocated UL grant.

If the target eNB does not support the release of RRC protocol which the source eNB used to configure the UE, the target eNB may be unable to comprehend the UE configuration provided by the source eNB. In this case, the target eNB should use the full configuration option to reconfigure the UE for HO and re-establishment. Full configuration option includes an initialization of the radio configuration, which makes the procedure independent of the configuration used in the source cell(s) with the exception that the security algorithms are continued for the RRC re-establishment.

The same behavior applies in EN-DC, if upon HO the target eNB is unable to comprehend the MCG part of the UE configuration i.e. the target eNB uses the full configuration option which involves release and configuration of (most of the) MCG and NR SCG configuration. In case of EN-DC, the target SgNB may be unable to comprehend the NR SCG configuration provided by the source SgNB. In such a case, the full configuration option may be applied for the NR SCG part of the configuration only.

After the successful completion of HO, PDCP SDUs may be re-transmitted in the target cell(s). This only applies for DRBs using RLC-AM mode and for HO not involving full configuration option. After the successful completion of HO not involving full configuration option, the SN and the HFN are reset except for the DRBs using RLC-AM mode (for which both SN and hyper system frame (HFN) continue). For reconfigurations involving the full configuration option, the PDCP entities are newly established (SN and HFN do not continue) for all DRBs irrespective of the RLC mode.

One UE behavior to be performed upon HO is specified, i.e. this is regardless of the HO procedures used within the network (e.g. whether the HO includes X2 or S1 signaling procedures).

The source eNB should, for some time, maintain a context to enable the UE to return in case of HO failure. After having detected HO failure, the UE attempts to resume the RRC connection either in the source PCell or in another cell using the RRC re-establishment procedure. This connection resumption succeeds only if the accessed cell is prepared, i.e. concerns a cell of the source eNB or of another eNB towards which HO preparation has been performed. The cell in which the re-establishment procedure succeeds becomes the PCell while SCells and secondary timing advance groups (STAGs), if configured, are released.

Normal measurement and mobility procedures are used to support HO to cells broadcasting a closed subscriber group (CSG) identity. In addition, E-UTRAN may configure the UE to report that it is entering or leaving the proximity of cell(s) included in its CSG whitelist. Furthermore, E-UTRAN may request the UE to provide additional information broadcast by the HO candidate cell e.g. global cell identity, CSG identity, CSG membership status.

E-UTRAN may use the proximity report to configure measurements as well as to decide whether or not to request additional information broadcast by the HO candidate cell. The additional information is used to verify whether or not the UE is authorised to access the target PCell and may also be needed to identify HO candidate cell (physical cell identity (PCI) confusion i.e. when the physical layer identity that is included in the measurement report does not uniquely identify the cell).

RRC connection reconfiguration is described. It may be referred to Section 5.3.5 of 3GPP TS 36.331 V15.0.1 (2017 December). The purpose of this procedure is to modify an RRC connection, e.g. to establish/modify/release RBs, to perform HO, to setup/modify/release measurements, to add/modify/release SCells. As part of the procedure, NAS dedicated information may be transferred from E-UTRAN to the UE.

Figure 7:
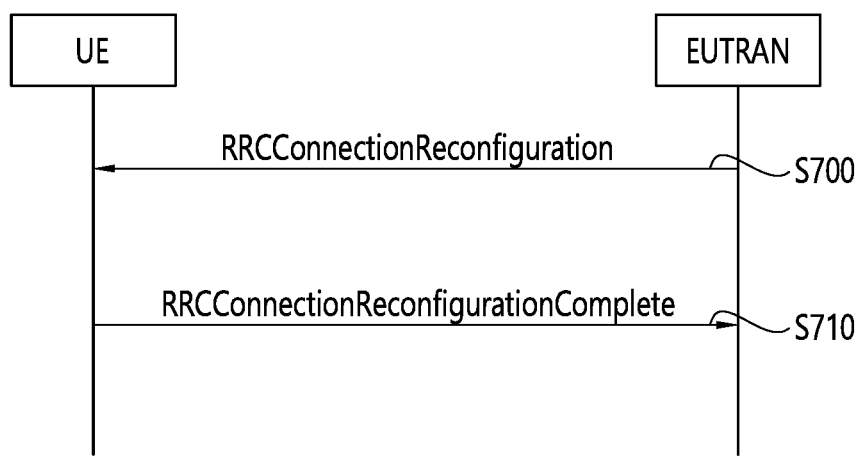
FIG. 7 shows RRC connection reconfiguration procedure.

FIG. 7 shows RRC connection reconfiguration procedure. In step S700, E-UTRAN may initiate the RRC connection reconfiguration procedure to a UE in RRC_CONNECTED by transmitting the RRCConnectionReconfiguration message. E-UTRAN applies the procedure as follows:
- the mobilityControlInfo is included only when AS-security has been activated, and SRB2 with at least one DRB are setup and not suspended;
- the establishment of RBs (other than SRB1, that is established during RRC connection establishment) is included only when AS security has been activated;
- the addition of SCells is performed only when AS security has been activated.

In step S710, the UE transmits the RRCConnectionReconfigurationComplete message to the EUTRAN in a response to the RRCConnectionReconfiguration message.

If the RRCConnectionReconfiguration message includes the mobilityControlInfo (i.e. HO) and the UE is able to comply with the configuration included in this message, the UE shall:
1> stop timer T310, if running;
1> stop timer T312, if running;
1> start timer T304 with the timer value set to t304, as included in the mobilityControlInfo;
1> stop timer T370, if running;
1> if the carrierFreq is included:
2> consider the target PCell to be one on the frequency indicated by the carrierFreq with a physical cell identity indicated by the targetPhysCellId;
1> else:
2> consider the target PCell to be one on the frequency of the source PCell with a physical cell identity indicated by the targetPhysCellId;
1> start synchronising to the DL of the target PCell;

The UE should perform the HO as soon as possible following the reception of the RRC message triggering the HO, which could be before confirming successful reception (HARQ and ARQ) of this message.
1> if bandwidth-reduced low-complexity (BL) UE or UE in coverage enhancement (CE):
2> if sameSFN-Indication is not present in mobilityControlInfo:
3> acquire the MasterInformationBlock in the target PCell;
1> if makeBeforeBreak is configured:
2> perform the remainder of this procedure including and following resetting MAC after the UE has stopped the UL transmission/DL reception with the source cell(s);

It is up to UE implementation when to stop the UL transmission/DL reception with the source cell(s) to initiate re-tuning for connection to the target cell [16], if makeBeforeBreak is configured.
1> reset MCG MAC and SCG MAC, if configured;
1> re-establish PDCP for all RBs configured with pdcp-config that are established;
1> re-establish MCG RLC and SCG RLC, if configured, for all RBs that are established;
1> configure lower layers to consider the SCell(s) other than the PSCell, if configured, to be in deactivated state;
1> apply the value of the newUE-Identity as the C-RNTI;
1> if the RRCConnectionReconfiguration message includes the fullConfig:
2> perform the radio configuration procedure;
1> configure lower layers in accordance with the received radioResourceConfigCommon;
1> if the received RRCConnectionReconfiguration message includes the rach-Skip:
2> configure lower layers to apply the rach-Skip for the target MCG;
1> configure lower layers in accordance with any additional fields, not covered in the previous, if included in the received mobilityControlInfo;
1> if the received RRCConnectionReconfiguration includes the sCellToReleaseList:
2> perform SCell release;
1> if the received RRCConnectionReconfiguration includes the scg-Configuration;
or 1> if the current UE configuration includes one or more split DRBs and the received RRCConnectionReconfiguration includes radioResourceConfigDedicated including drb-ToAddModList:
   2> perform SCG reconfiguration;
1> if the RRCConnectionReconfiguration message includes the radioResourceConfigDedicated:
   2> perform the radio resource configuration procedure;
1> set the content of RRCConnectionReconfigurationComplete message as follows:
   2> if the UE has RLF or HO failure information available in VarRLF-Report and if the registered PLMN (RPLMN) is included in plmn-IdentityList stored in VarRLF-Report:
      3> include rlf-InfoAvailable;
   2> if the UE has multimedia broadcast multicast service single frequency network (MBSFN) logged measurements available for E-UTRA and if the RPLMN is included in plmn-IdentityList stored in VarLogMeasReport and if T330 is not running:
      3> include logMeasAvailableMBSFN;
   2> else if the UE has logged measurements available for E-UTRA and if the RPLMN is included in plmn-IdentityList stored in VarLogMeasReport:
      3> include the logMeasAvailable;
   2> if the UE has connection establishment failure information available in VarConnEstFailReport and if the RPLMN is equal to plmn-Identity stored in VarConnEstFailReport:
      3> include connEstFailInfoAvailable;
   2> if the RRCConnectionReconfiguration message includes perCC-GapIndicationRequest:
      3> include perCC-GapIndicationList and numFreqEffective;
   2> if the frequencies are configured for reduced measurement performance:
      3> include numFreqEffectiveReduced;
1> submit the RRCConnectionReconfigurationComplete message to lower layers for transmission;
1> if MAC successfully completes the random access procedure; or
1> if MAC indicates the successful reception of a PDCCH transmission addressed to C-RNTI and if rach-Skip is configured:
   2> stop timer T304;
   2> release ul-ConfigInfo, if configured;
   2> the procedure ends;

The UE is not required to determine the SFN of the target PCell by acquiring system information from that cell before performing RACH access in the target PCell, except for BL UEs or UEs in CE when sameSFN-Indication is not present in mobilityControlInfo.

SCG reconfiguration is described. It may be referred to Section 5.3.10.10 of 3GPP TS 36.331 V15.0.1 (2017 December). The UE shall:
1> if makeBeforeBreakSCG is configured:
   2> stop timer T313, if running;
   2> start timer T307 with the timer value set to t307, as included in the mobilityControlInfoSCG;
   2> start synchronizing to the DL of the target PSCell, if needed;
   2> perform the remainder of this procedure including and following resetting MAC after the UE has stopped the UL transmission/DL reception with the source SCG cell(s);
   It is up to UE implementation when to stop the UL transmission/DL reception with the source SCG cell(s) to initiate re-tuning for the connection to the target cell, if makeBeforeBreakSCG is configured.

Figure 8:
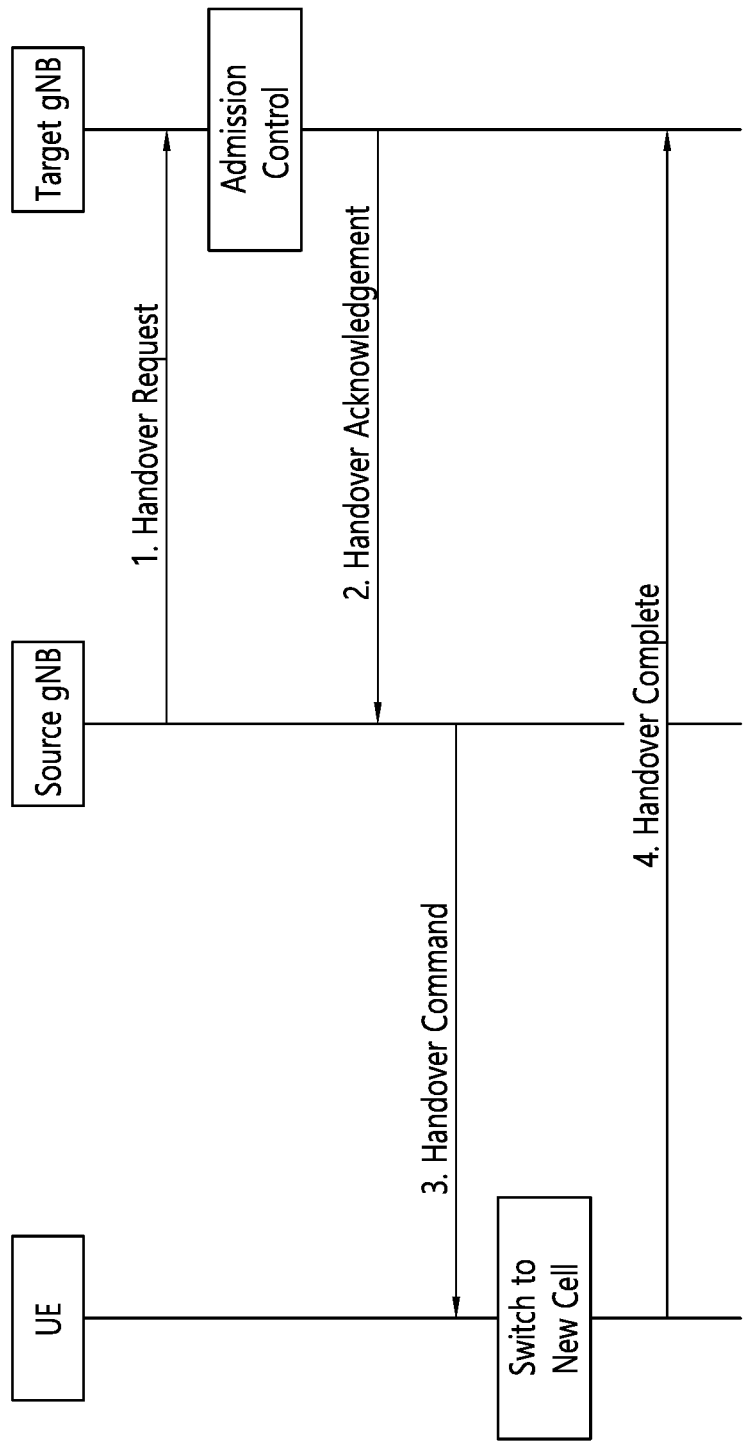
FIG. 8 shows inter-gNB HO procedures.

1> if the received scg-Configuration is set to release or includes the mobilityControlInfoSCG (i.e. SCG release/change):
   2> if mobilityControlInfo is not received (i.e. SCG release/change without HO):
      3> reset SCG MAC, if configured;
      3> for each drb-Identity value that is part of the current UE configuration:
         4> if the DRB indicated by drb-Identity is an SCG DRB:
            5> re-establish the PDCP entity and the SCG RLC entity or entities;
         4> if the DRB indicated by drb-Identity is a split DRB:
            5> perform PDCP data recovery and re-establish the SCG RLC entity;
         4> if the DRB indicated by drb-Identity is an MCG DRB; and
         4> drb-ToAddModListSCG is received and includes the drb-Identity value, while for this entry drb-Type is included and set to scg (i.e. MCG to SCG):
            5> re-establish the PDCP entity and the MCG RLC entity or entities;
      3> configure lower layers to consider the SCG SCell(s), except for the PSCell, to be in deactivated state;
   1> if the received scg-Configuration is set to release:
      2> release the entire SCG configuration, except for the DRB configuration (i.e. as configured by drb-ToAddModListSCG);
      2> if the current UE configuration includes one or more split or SCG DRBs and the received RRCConnectionReconfiguration message includes radioResourceConfigDedicated including drb-ToAddModList:
         3> reconfigure the SCG or split DRB by drb-ToAddModList;
      2> stop timer T313, if running;
      2> stop timer T307, if running;
   1> else:
      2> if the received scg-ConfigPartMCG includes the scg-Counter:
         3> update the S-$K_{eNB}$ key based on the $K_{eNB}$ key and using the received scg-Counter value;
         3> derive the $K_{UPenc}$ key associated with the cipheringAlgorithmSCG included in mobilityControlInfoSCG within the received scg-ConfigPartSCG;
         3> configure lower layers to apply the ciphering algorithm and the $K_{UPenc}$ key;
      2> if the received scg-ConfigPartSCG includes the radioResourceConfigDedicatedSCG:
         3> reconfigure the dedicated radio resource configuration for the SCG;
      2> if the current UE configuration includes one or more split or SCG DRBs and the received RRCConnectionReconfiguration message includes radioResourceConfigDedicated including drb-ToAddModList:
         3> reconfigure the SCG or split DRB by drb-ToAddModList;
      2> if the received scg-ConfigPartSCG includes the sCellToReleaseListSCG:
         3> perform SCell release for the SCG;
      2> if the received scg-ConfigPartSCG includes the pSCellToAddMod:
         3> perform PSCell addition or modification;
      This procedure is also used to release the PSCell e.g. PSCell change, SI change for the PSCell.
      2> if the received scg-ConfigPartSCG includes the sCellToAddModListSCG:
         3> perform SCell addition or modification;

2> configure lower layers in accordance with mobility-ControlInfoSCG, if received;
2> if rach-SkipSCG is configured:
3> configure lower layers to apply the rach-SkipSCG for the target SCG;
2> if the received scg-ConfigPartSCG includes the mobilityControlInfoSCG (i.e. SCG change):
3> resume all SCG DRBs and resume SCG transmission for split DRBs, if suspended;
3> stop timer T313, if running;
3> start timer T307 with the timer value set to t307, as included in the mobilityControlInfoSCG, if makeBeforeBreakSCG is not configured;
3> start synchronizing to the DL of the target PSCell;
3> initiate the random access procedure on the PSCell, if rach-SkipSCG is not configured:
The UE is not required to determine the SFN of the target PSCell by acquiring system information from that cell before performing RACH access in the target PSCell.
3> the procedure ends, except that the following actions are performed when MAC successfully completes the random access procedure on the PSCell or when MAC indicates the successful reception of a PDCCH transmission addressed to C-RNTI and if rach-skipSCG is configured:
4> stop timer T307;
4> release ul-ConfigInfo, if configured;
DL assignment reception is described. It may be referred to Section 5.3.1 of 3GPP TS 36.321 V15.0.0 (2017 December). DL assignments transmitted on the PDCCH indicate if there is a transmission on a DL-SCH for a particular MAC entity and provide the relevant HARQ information.
When the MAC entity has a C-RNTI, semi-persistent scheduling (SPS) C-RNTI, or temporary C-RNTI, the MAC entity shall for each TTI during which it monitors PDCCH and for each serving cell:
1> if a DL assignment for this TTI and this serving cell has been received on the PDCCH for the MAC entity's C-RNTI, or temporary C-RNTI:
2> f this is the first DL assignment for this temporary C-RNTI:
3> consider the new data indicator (NDI) to have been toggled.
2> if the DL assignment is for the MAC entity's C-RNTI and if the previous DL assignment indicated to the HARQ entity of the same HARQ process was either a DL assignment received for the MAC entity's SPS C-RNTI or a configured DL assignment:
3> consider the NDI to have been toggled regardless of the value of the NDI.
2> indicate the presence of a DL assignment and deliver the associated HARQ information to the HARQ entity for this TTI.
1> else, if this serving cell is the special cell (SpCell) and a DL assignment for this TTI has been received for the SpCell on the PDCCH of the SpCell for the MAC entity's SPS C-RNTI:
2> if the NDI in the received HARQ information is 1:
3> consider the NDI not to have been toggled;
3> indicate the presence of a DL assignment and deliver the associated HARQ information to the HARQ entity for this TTI.
2> else, if the NDI in the received HARQ information is 0:
3> if PDCCH contents indicate SPS release:
4> clear the configured DL assignment (if any);
4> if the timeAlignmentTimer associated with the primary TAG (pTAG) is running:
5> indicate a positive acknowledgement for the DL SPS release to the physical layer.
3> else:
4> store the DL assignment and the associated HARQ information as configured DL assignment;
4> initialize (if not active) or re-initialise (if already active) the configured DL assignment to start in this TTI and to recur according to rules;
4> set the HARQ Process ID to the HARQ Process ID associated with this TTI;
4> consider the NDI bit to have been toggled;
4> indicate the presence of a configured DL assignment and deliver the stored HARQ information to the HARQ entity for this TTI.
1> else, if this serving cell is the SpCell and a DL assignment for this TTI has been configured for the SpCell and there is no measurement gap in this TTI and there is no sidelink discovery gap for reception in this TTI; and
1> if this TTI is not an MBSFN subframe of the SpCell or the MAC entity is configured with transmission mode tm9 or tm10 on the SpCell:
2> instruct the physical layer to receive, in this TTI, transport block on the DL-SCH according to the configured DL assignment and to deliver it to the HARQ entity;
2> set the HARQ Process ID to the HARQ Process ID associated with this TTI;
2> consider the NDI bit to have been toggled;
2> indicate the presence of a configured DL assignment and deliver the stored HARQ information to the HARQ entity for this TTI.
1> if the MAC entity is configured with rach-Skip or rach-SkipSCG and a UE contention resolution identity MAC CE for this TTI has been received on the PDSCH indicated by the PDCCH of the SpCell addressed to the C-RNTI:
2> indicate to upper layer the successful reception of a PDCCH transmission addressed to the C-RNTI.
Mobility in RRC_CONNECTED in NR is described. It may be referred to Section 9.2.3 of 3GPP TS 38.300 V15.0.0 (2017 December). Network controlled mobility applies to UEs in RRC_CONNECTED and is categorized into two types of mobility: cell level mobility and beam level mobility.
FIG. 8 shows inter-gNB HO procedures. Cell level mobility requires explicit RRC signaling to be triggered, i.e. HO. For inter-gNB HO, the signaling procedures consist of at least the following elemental components shown in FIG. 8.
Step 1: The source gNB initiates HO and issues a Handover Request message over the Xn interface.
Step 2: The target gNB performs admission control and provides the RRC configuration as part of the Handover Acknowledgement message.
Step 3: The source gNB provides the RRC configuration to the UE in the Handover Command message. The Handover Command message includes at least cell ID and all information required to access the target cell so that the UE can access the target cell without reading system information. For some cases, the information required for contention based and contention free random access can be included in the Handover Command message. The access information to the target cell may include beam specific information, if any.
Step 4: The UE moves the RRC connection to the target gNB and replies the Handover Complete message.
The HO mechanism triggered by RRC requires the UE at least to reset the MAC entity and re-establish RLC. RRC managed HO with and without PDCP entity re-establishment are both supported. For DRBs using RLC AM mode, PDCP can either be re-established together with a security key change or initiate a data recovery procedure without a key change. For DRBs using RLC unacknowledged mode (UM) mode and for SRBs, PDCP can either be re-established together with a security key change or remain as it is without a key change.

Data forwarding, in-sequence delivery and duplication avoidance at HO can be guaranteed when the target gNB uses the same DRB configuration and QoS flow to DRB mapping as the source gNB.

Timer based HO failure procedure is supported in NR. RRC connection re-establishment procedure is used for recovering from HO failure.

Beam level mobility does not require explicit RRC signaling to be triggered—it is dealt with at lower layers—and RRC is not required to know which beam is being used at a given point in time.

Figure 9:
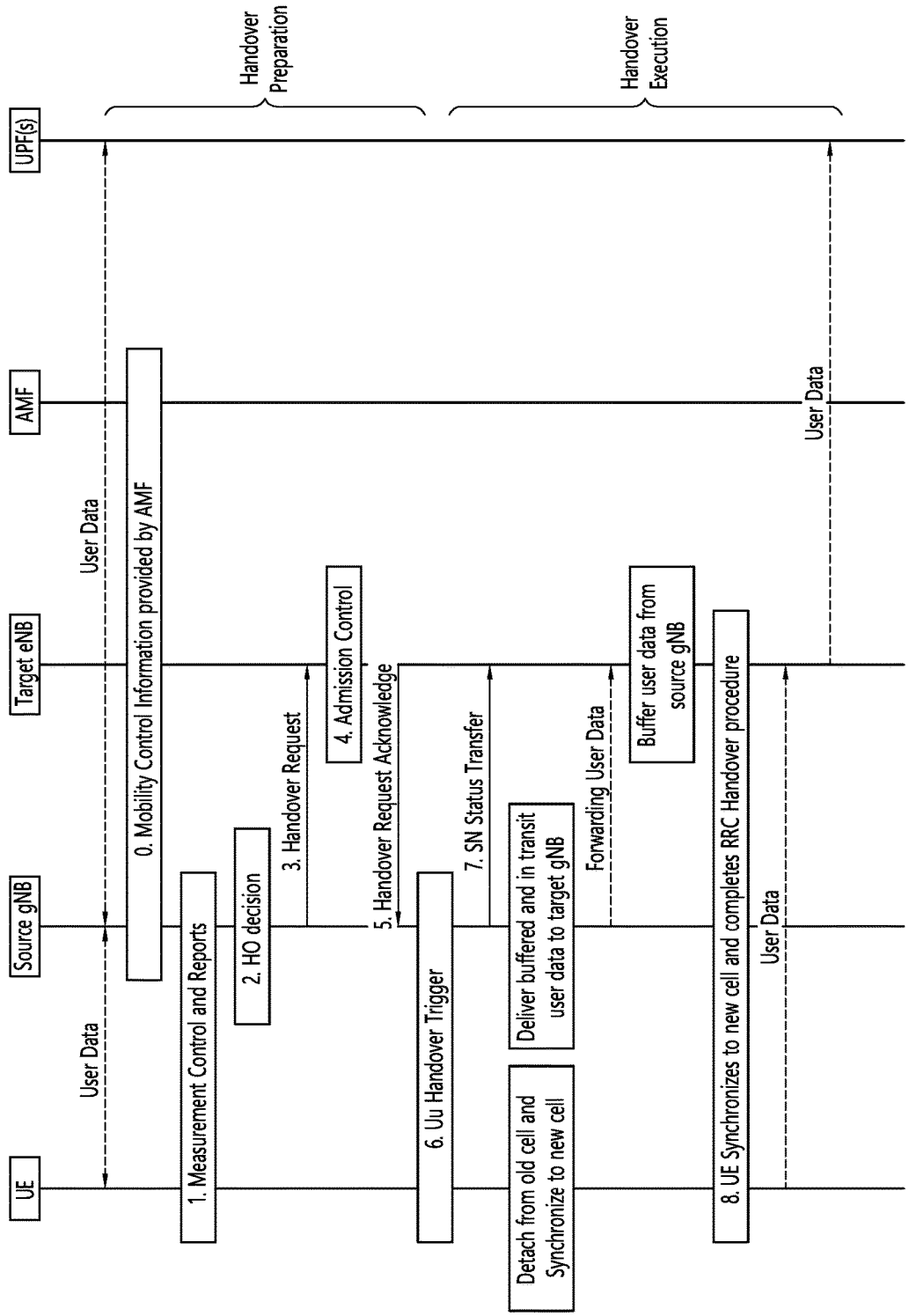
FIG. 9 shows intra-AMF/UPF HO.

FIG. 9 shows intra-AMF/UPF HO. FIG. 9 describes C-plane handling in intra-AMF/UPF HO. The intra-NR RAN HO performs the preparation and execution phase of the HO procedure performed without involvement of the 5GC, i.e. preparation messages are directly exchanged between the gNBs. The release of the resources at the source gNB during the HO completion phase is triggered by the target gNB. FIG. 9 only shows HO preparation and execution phases, but does not show HO completion phase. Below is a more detailed description of the intra-AMF/UPF HO.

Step 0: The UE context within the source gNB contains information regarding roaming and access restrictions which were provided either at connection establishment or at the last TA update.

Step 1: The source gNB configures the UE measurement procedures and the UE reports according to the measurement configuration.

Step 2: The source gNB decides to HO the UE, based on MEASUREMENT REPORT and RRM information.

Step 3: The source gNB issues a HANDOVER REQUEST message to the target gNB passing a transparent RRC container with necessary information to prepare the HO at the target side. The information includes at least the target cell ID, KgNB*, the C-RNTI of the UE in the source gNB, RRM-configuration including UE inactive time, basic AS-configuration including antenna Info and DL Carrier Frequency, the UE capabilities for different RATs, and can include the UE reported measurement information including beam-related information if available. Also, if CA is configured, the RRM configuration can include the list of best cells on each frequency for which measurement information is available.

Step 4: Admission control may be performed by the target gNB.

Step 5: The target gNB prepares the HO with L1/L2 and sends the HANDOVER REQUEST ACKNOWLEDGE message to the source gNB. The HANDOVER REQUEST ACKNOWLEDGE message includes a transparent container to be sent to the UE as an RRC message to perform the HO.

Step 6: The source gNB triggers the Uu HO and sends the Handover Command message to the UE. The Handover Command message carries the information required to access the target cell, which includes at least the target cell ID, the new C-RNTI, the target gNB security algorithm identifiers for the selected security algorithms, can include a set of dedicated RACH resources, the association between RACH resources and synchronization signal (SS)/physical broadcast channel (PBCH) blocks, the association between RACH resources and UE-specific channel state information (CSI)-RS configuration(s), common RACH resources, and target gNB SIBs, etc.

Step 7: The source gNB sends the SN STATUS TRANSFER message to the target gNB.

Step 8: The UE synchronizes to the target cell and completes the RRC HO procedure.

The RRM configuration can include both beam measurement information (for layer 3 mobility) associated to SS/PBCH block(s) and CSI-RS(s) for the reported cell if both types of measurements are available.

The common RACH configuration for beams in the target cell is only associated to the SS/PBCH block(s). The network can have dedicated RACH configurations associated to the SS/PBCH block(s) and/or have dedicated RACH configurations associated to CSI-RS(s) within a cell. The target gNB can only include one of the following RACH configurations in the Handover Command message to enable the UE to access the target cell:

1) Common RACH configuration;
2) Common RACH configuration+dedicated RACH configuration associated with SS/PBCH block;
3) Common RACH configuration+dedicated RACH configuration associated with CSI-RS.

The dedicated RACH configuration allocates RACH resource(s) together with a quality threshold to use them. When dedicated RACH resources are provided, they are prioritized by the UE and the UE shall not switch to contention-based RACH resources as long as the quality threshold of those dedicated resources is met. The order to access the dedicated RACH resources is up to UE implementation.

In NR, operation of beams based on SS/PBCH blocks and CSI-RS is introduced. Thus, if RACH procedure is used in HO, upon receiving the HO command, the UE performs RACH procedure in which the UE finally selects a beam suitable for transmission of HO complete message (i.e. RRCConnectionReconfigurationComplete) via one or more preamble transmissions.

As described above, RACH-less HO was introduced in LTE to minimize service interruption time during HO. If RACH-less HO is used with beam operation, target gNB may send pre-allocated UL grant configuration including a beam resource to the UE. However, when the UE sends HO complete message to the target gNB with the pre-allocated UL grant, the pre-allocated UL grant would always not lead to successful transmission of the HO complete message. For example, the pre-allocated beam may easily become unsuitable for this UE to transmit the HO complete message because a narrow beam would be more sensitive to radio channel variation, thereby transmission of the HO complete message may be unsuccessful. Accordingly, RACH-less HO with beam resource may result in more frequent HO failure.

Figure 10:
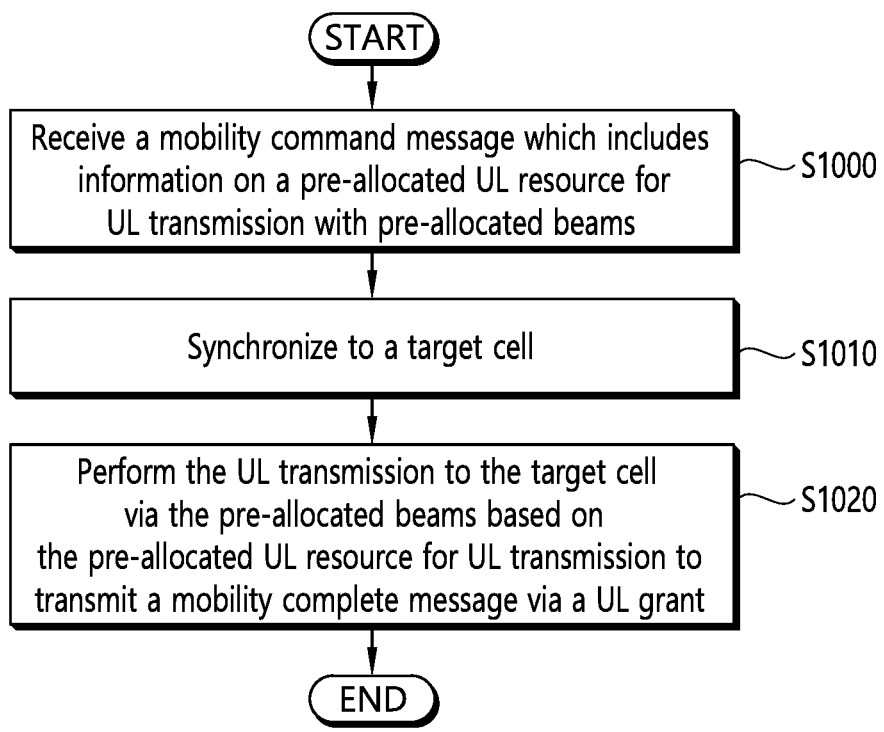
FIG. 10 shows a method for performing a mobility procedure according to an embodiment of the present invention.

FIG. 10 shows a method for performing a mobility procedure according to an embodiment of the present invention.

In step S1000, the UE receives a mobility command message which includes information on a pre-allocated UL resource for UL transmission with pre-allocated beams. In step S1010, the UE synchronizes to a target cell. In step S1020, the UE performs the UL transmission to the target cell via the pre-allocated beams based on the pre-allocated UL resource for UL transmission to transmit a mobility complete message via a UL grant.

The information on the pre-allocated UL resource may be a pre-allocated UL grant, and the UL transmission may be a PUSCH transmission. In this case, the pre-allocated UL resource may be UL resource for the PUSCH transmission which is pre-allocated based on the pre-allocated UL grant.

The UE may determine that a quality of the pre-allocated beams meets the criterion. The criterion may be indicated by the target cell. In this case, the UE may perform initial PUSCH transmission and/or a PUSCH retransmission for a MAC PDU including the mobility complete message to the target cell via at least one beam among the pre-allocated beams based on the pre-allocated UL grant in response to the mobility command message. The UE may perform PUSCH retransmission of the MAC PDU including the mobility complete message to the target cell via another beam among the pre-allocated beams based on the pre-allocated UL grant, until an acknowledgment is received and/or the maximum number of retransmissions is reached.

When the UE determines that there is no pre-allocated beam of which quality meets the criterion, the UE may perform a random access procedure towards the target cell. In the random access procedure, the UE may transmit a RACH preamble with a beam and then may (re-)transmit the MAC PDU upon receiving a random access response in response to the RACH preamble.

The UE may consider that a mobility to the target cell is successfully completed when an acknowledgement is received from the target cell. The acknowledgement may be a PDCCH addressed to a UE-specific RNTI (e.g. C-RNTI). That is, the successful reception of a PDCCH transmission addressed to a UE specific RNTI may be considered as reception of the acknowledgment.

The UE may consider that a mobility to the target cell is unsuccessfully completed when an acknowledgement is not received from the target cell until a timer expires and/or a maximum number of retransmission is reached. In this case, the UE may release the pre-allocated UL resource, and trigger random access procedure and/or RRC connection resume procedure and/or RRC connection reestablishment procedure. Alternatively, the UE may perform retransmission of the MAC PDU to the target cell via at least one beam which does not belong to the pre-allocated beams. The UE may start a timer when the mobility command message is received.

Alternatively, the information on the pre-allocated UL resource may be a pre-allocated sounding reference signal (SRS) resource configuration, and the UL transmission may be an SRS transmission. In this case, the pre-allocated UL resource may be UL resource for the SRS transmission which is pre-allocated based on the pre-allocated SRS resource configuration.

The SRS transmission may be performed until a PDCCH addressed to a UE-specific RNTI is successfully received. That is, the UE may trigger SRS transmission to the target cell with the pre-allocated beams at one or more occasions based on the mobility command message, until the successful reception of the PDCCH addressed to the UE-specific RNTI. When the PDCCH addressed to the UE-specific RNTI is successfully received, the UE may transmit a MAC PDU including the mobility complete message to the target cell via a PUSCH based on the PDCCH addressed to the UE-specific RNTI. When the PDCCH addressed to the UE-specific RNTI is not successfully received until a timer expires and/or a maximum number of SRS transmissions is reached, the UE may perform a random access procedure towards the target cell to transmit the mobility complete message. In the random access procedure, the UE may transmit a RACH preamble with a beam and then may (re-)transmit the MAC PDU upon receiving a random access response in response to the RACH preamble.

According to embodiment of the present invention shown in FIG. 10, when UL resource for UL transmission, i.e. PUSCH transmission and/or SRS transmission, is pre-configured with pre-allocated beams, and when mobility procedure without RACH procedure is performed, the mobility procedure can be completed with one or more beams among the pre-allocated beams with good condition. If there are no beam with good condition among the pre-allocated beams, the UE may fallback to RACH procedure to complete the mobility procedure. Therefore, more frequent mobility failure can be avoided when the mobility procedure without RACH procedure with beam resource is performed.

The more detailed description for embodiments of the present invention is as follows.

1. Pre-Allocated PUSCH Grant for HO and/or SCG Addition

Figure 11:
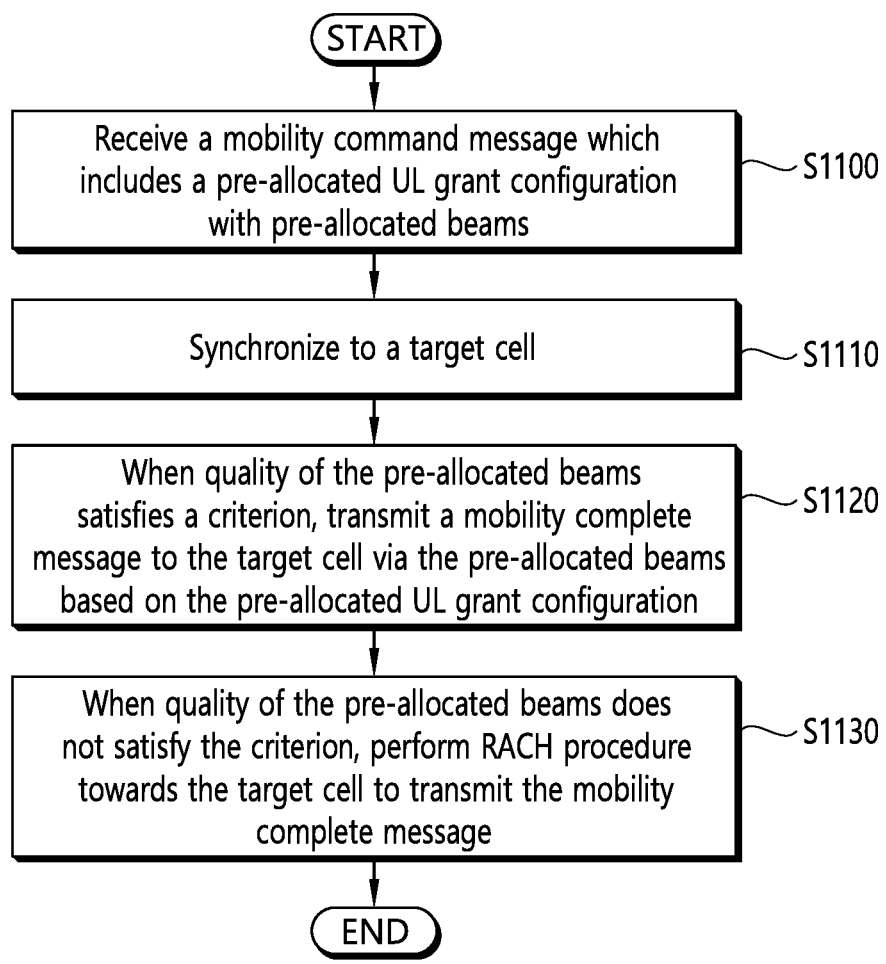
FIG. 11 shows a method for performing synchronous reconfiguration (e.g. PCell change (i.e. HO) and/or SCG reconfiguration) according to an embodiment of the present invention.

FIG. 11 shows a method for performing synchronous reconfiguration (e.g. PCell change (i.e. HO) and/or SCG reconfiguration) according to an embodiment of the present invention.

In step S1100, the UE receives a mobility command message which includes a pre-allocated UL grant configuration with pre-allocated beams. The mobility command message may be for HO and/or SCG reconfiguration. The mobility command message may be generated by the target gNB. The pre-allocated beams may be associated with one or more SS/PBCH blocks and/or one or more CSI-RSs transmitted by the target gNB.

In step S1110, the UE synchronizes to a target cell. The UE may synchronize to the target cell based on the mobility command message.

In step S1120, when quality of the pre-allocated beams satisfies a criterion, the UE transmits a mobility complete message to the target cell via the pre-allocated beams based on the pre-allocated UL grant configuration. A threshold for the criterion may be indicated by the target gNB. If the quality of at least one beam among the pre-allocated beams is above a threshold indicated by the target gNB, it may be determined that the criterion is met. That is, if the UE determines that the quality of one or more beams among the pre-allocated beams meets the criterion, the UE may perform initial PUSCH transmission and/or a PUSCH retransmission of a MAC PDU including the mobility complete message to the target gNB via the one or more beams among the pre-allocated beams based on the pre-allocated UL grant configuration, in response to the mobility command message.

The UE may perform PUSCH retransmission of the MAC PDU including the mobility complete message to the target gNB via one or more beams among the pre-allocated beams based on the pre-allocated UL grant configuration, until an acknowledgment is received and/or the maximum number of retransmissions is reached. The UE may perform PUSCH retransmission of the MAC PDU including the mobility complete message to the target gNB via another one or more beams among the pre-allocated beams, if HARQ non-acknowledgement (NACK) to a previous PUSCH (re-)transmission is received, and/or if there is no pre-allocated beam of which quality meets the criterion. Alternatively, the used beam may belong to one of the other beams than the pre-allocated beams.

In step S1130, when quality of the pre-allocated beams does not satisfy the criterion, the UE performs RACH procedure towards the target cell to transmit the mobility complete message. A threshold for the criterion may be indicated by the target gNB. If qualities of all the pre-allocated beams are not above a threshold indicated by the target gNB, it may be determined that the criterion is not met. That is, if the UE determines that there is no pre-allocated beam of which quality meets the criterion, the UE may perform RACH procedure. In the RACH procedure, the UE may transmit a RACH preamble with a beam and then (re-)transmit the MAC PDU including the mobility complete message upon receiving a random access response in response to the RACH preamble. The beam used for RACH preamble transmission may be configured by the mobility command message. The beam may be associated with one of the pre-allocated beams based on SS/PBCH blocks and/or CSI-RSs of the target cell.

The UE may consider that the mobility to the target cell is successfully completed if an acknowledgment is received from the target cell. The successful reception of a PDCCH addressed to a UE specific RNTI (e.g. C-RNTI) may be considered as reception of the acknowledgment from the target cell. Or, the successful reception of a particular MAC CE (e.g. UE contention resolution identity MAC CE) on the PDSCH indicated by a PDCCH addressed to a UE specific RNTI may be considered as reception of the acknowledgment from the target cell. If the acknowledgment is received and/or the mobility to the target cell is successfully completed, the UE may release the pre-allocated UL grant configuration with the pre-allocated beams.

If the UE fails to receive the acknowledgment from the target cell until a timer expires and/or if the maximum number of retransmissions is reached, the UE may trigger RACH procedure, RRC connection resume procedure, and/or RRC connection re-establishment procedure. If the UE fails to receive the acknowledgment from the target cell until a timer expires and/or if the maximum number of retransmissions is reached, the UE may perform retransmission of the MAC PDU including the mobility complete message to the target gNB via one or more beams which do not belong to the pre-allocated beams. The UE may start the timer when the mobility command message is received.

According to embodiment of the present invention shown in FIG. 11, when the pre-allocated UL grant configuration is provided with pre-allocated beams, and when synchronous reconfiguration procedure without RACH procedure is performed, the synchronous reconfiguration procedure can be completed with one or more beams among the pre-allocated beams with good condition. If there are no beam with good condition among the pre-allocated beams, the UE may fallback to RACH procedure to complete the synchronous reconfiguration procedure. Therefore, more frequent failure can be avoided when the synchronous reconfiguration procedure without RACH procedure with beam resource is performed.

Figure 12:
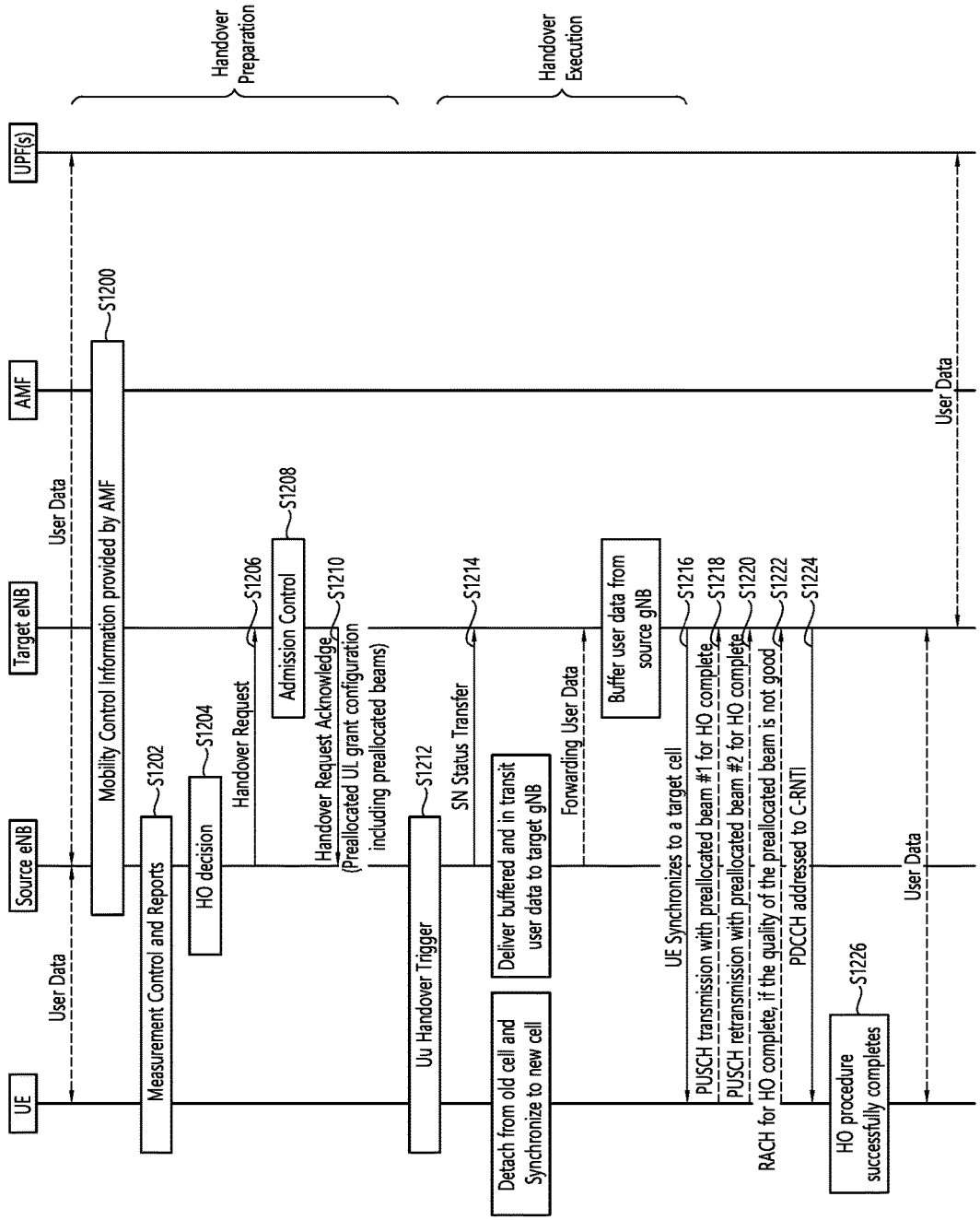
FIG. 12 shows a method for performing a HO procedure according to an embodiment of the present invention.

FIG. 12 shows a method for performing a HO procedure according to an embodiment of the present invention.

Step S1200: The UE context within the source gNB contains information regarding roaming and access restrictions which were provided either at connection establishment or at the last TA update.

Step 1202: The source gNB configures the UE measurement procedures and the UE reports according to the measurement configuration. The RRM configuration can include both beam measurement information (for layer 3 mobility) associated to SS/PBCH block(s) and CSI-RS(s) for the reported cell if both types of measurements are available.

Step S1204: The source gNB decides to HO the UE, based on MEASUREMENT REPORT and RRM information.

Step S1206: The source gNB issues a HANDOVER REQUEST message to the target gNB passing a transparent RRC container with necessary information to prepare the HO at the target side. The information includes at least the target cell ID, KgNB*, the C-RNTI of the UE in the source gNB, RRM-configuration including UE inactive time, basic AS-configuration including antenna Info and DL Carrier Frequency, the UE capabilities for different RATs, and can include the UE reported measurement information including beam-related information if available. Also, if CA is configured, the RRM configuration can include the list of best cells on each frequency for which measurement information is available.

Step S1208: Admission control may be performed by the target gNB.

Step S1210: The target gNB prepares the HO with L1/L2 and sends the HANDOVER REQUEST ACKNOWLEDGE message to the source gNB. The HANDOVER REQUEST ACKNOWLEDGE message includes a transparent container to be sent to the UE as an RRC message to perform the HO.

Step S1212: The source gNB triggers the Uu HO and sends the Handover Command message to the UE. The Handover Command message carries the information required to access the target cell, which includes at least the target cell ID, the new C-RNTI, the target gNB security algorithm identifiers for the selected security algorithms, can include a set of dedicated RACH resources, the association between RACH resources and SS blocks, the association between RACH resources and UE-specific CSI-RS configuration(s), common RACH resources, and target gNB SIBs, etc.

In addition, the Handover Command message may include information on RACH-less HO, i.e. RACH-skip, and pre-allocated UL grant configuration including multiple beams. The multiple beams may be associated with multiple SS/PBCH blocks and/or multiple CSI-RSs transmitted by the target gNB. The pre-allocated UL grant configuration may also include a quality threshold, UL scheduling interval ul-SchedInterval, starting subframe ul-StartSubframe of the pre-allocated UL grant, the UL grant ul-Grant and the number of HARQ process for the pre-allocated UL grant numberOfConfUL-Processes. Those parameters in the pre-allocated UL grant configuration may determine one or more PUSCH occasions where UE can transmit a MAC PDU with the pre-allocated UL grants and beams.

The pre-allocated UL grant configuration may include the beam transmission pattern across multiple PUSCH occasions. For example, beam transmission pattern may indicate which beam(s) is used and/or a candidate(s) in different UL scheduling intervals or different subframes where pre-allocated UL grant is configured.

Step S1214: The source gNB sends the SN STATUS TRANSFER message to the target gNB.

Step S1216: The UE synchronizes to the target cell.

Step S1218: If the Handover Command message includes RACH-skip, the UE transmits the Handover Complete message with one or more pre-allocated beams to complete the RRC handover procedure.

The pre-allocated UL grant configuration may allocate pre-allocated beams together with a quality threshold to use the pre-allocated beams. When the pre-allocated beams are provided, they may be prioritized by the UE and the UE shall not switch to other beams than the pre-allocated beams as long as the quality threshold of the pre-allocated beams is met. Namely, if pre-allocated beams are provided and the quality of one or more beam among the pre-allocated beams is above the quality threshold, the UE may select the one or more beam among the pre-allocated beams above the quality threshold. And then, the UE may perform a new transmission of a MAC PDU including the Handover Complete message via a PUSCH occasion with the selected beam(s) based on the pre-allocated UL grant configuration.

Step S1220: If transmission of the MAC PDU is not acknowledged or if transmission of the MAC PDU is not completed, the UE may select another beam(s) among the pre-allocated beams of which quality is above the quality threshold based on the beam transmission pattern. And then, the UE may perform retransmission of the MAC PDU including the Handover Complete message via a next PUSCH occasion with the selected beam(s) based on the pre-allocated UL grant configuration.

For example, the beam transmission pattern may indicate beam index #1 and #11 at the first PUSCH occasion while beam index #2 and #12 at the second PUSCH occasion. The UE may select one or two of beam index #1 and #11 at the first PUSCH occasion based on the qualities of those beams in step S1218. Therefore, the UE may perform a new transmission of a MAC PDU including the Handover Complete message with pre-allocated beam #1 and #11 at the first PUSCH occasion. Furthermore, the UE may select one or two of beam index #2 and #12 at the second PUSCH occasion based on the qualities of those beams in step S1220. Therefore, the UE may perform retransmission of the MAC PDU including the Handover Complete message with pre-allocated beam #2 and #12 at the second PUSCH occasion. Thus, the UE may switch selected beam(s) whenever the UE performs HARQ (re-)transmission.

For another example, the beam transmission pattern may indicate beam index #1 and #11 at the first set of PUSCH occasions while beam index #2 and #12 at the second set of PUSCH occasions. The UE may select one or two of beam index #1 and #11 at the first set of PUSCH occasions based on the qualities of those beams in step S1218. Therefore, the UE may perform a new transmission of a MAC PDU including the Handover Complete message with pre-allocated beam #1 and #11 at the first set of PUSCH occasions. Furthermore, the UE may select one or two of beam index #2 and #12 at the second set of PUSCH occasions based on the qualities of those beams in step S1220. Therefore, the UE may perform retransmission of the MAC PDU including the Handover Complete message with pre-allocated beam #2 and #12 at the second set of PUSCH occasions. Thus, the UE may switch selected beam(s) after the UE performs N number of HARQ (re-)transmissions.

Step S1222: If the pre-allocated beams are provided in the Handover Command message but there is no pre-allocated beam of which quality is above the quality threshold, or if the pre-allocated UL grant configuration is not provided in the Handover Command message, the UE initiates a random access procedure. In this random access procedure, UE may select a beam of which quality is good, based on configuration received from system information of the target cell and/or RACH configuration received from the Handover Command message. Then, the UE may transmit a preamble with the selected beam which is either one of the pre-allocated beams or one of the other beams. Upon receiving a random access response to the preamble, the UE may transmit a MAC PDU including the Handover Complete message via PUSCH as a message 3 in the random access procedure.

Alternatively, if the pre-allocated beams are provided in the Handover Command message but there is no pre-allocated beam of which quality is above the quality threshold, or if pre-allocated UL grant configuration not including the pre-allocated beams is provided in the Handover Command message, the UE may select a beam of which quality is good and then transmit a MAC PDU including the Handover Complete message via PUSCH with the selected beam which is either one of the pre-allocated beams or one of the other beams.

Step S1224: The UE receives the PDCCH addressed to the UE-specific RNTI (e.g. C-RNTI).

Step S1226: The UE considers that the HO procedure is successfully completed upon receiving the PDCCH addressed to the UE-specific RNTI.

More generally, the UE may consider that the mobility to the target cell is successfully completed if an acknowledgment is received from the target cell. The successful reception of a PDCCH addressed to a UE-specific RNTI (e.g. C-RNTI) may be considered as reception of the acknowledgment. Or, the successful reception of a particular MAC CE (e.g. UE contention resolution identity MAC CE) on the PDSCH indicated by a PDCCH addressed to a UE specific RNTI may be considered as reception of the acknowledgment. If an acknowledgment is received from the target cell and/or the mobility to the target cell is successfully completed, the UE may release the pre-allocated UL grant configuration including the pre-allocated beams.

If an acknowledgment is not received from the target cell until the timer expires and/or the maximum number of retransmissions is reached, the UE may consider that the mobility to the target cell is unsuccessfully completed. Then, the UE may release the pre-allocated UL grant configuration including the pre-allocated beams and trigger RRC connection re-establishment procedure.

Afterwards, the target gNB sends a PATH SWITCH REQUEST message to AMF to trigger 5GC to switch the DL data path towards the target gNB and to establish an NG-C interface instance towards the target gNB. 5GC switches the DL data path towards the target gNB. The AMF confirms the PATH SWITCH REQUEST message with the PATH SWITCH REQUEST ACKNOWLEDGE message. By sending the UE CONTEXT RELEASE message, the target gNB informs the source gNB about the success of HO and triggers the release of resources by the source gNB. The target gNB sends this message after the PATH SWITCH REQUEST ACKNOWLEDGE message is received from the AMF. Upon reception of the UE CONTEXT RELEASE message, the source gNB can release radio and C-plane related resources associated to the UE context. Any ongoing data forwarding may continue.

According to embodiment of the present invention shown in FIG. 12, when the pre-allocated UL grant configuration is provided with pre-allocated beams, and when RACH-less HO is performed, the RACH-less HO can be completed with one or more beams among the pre-allocated beams with good condition. If there are no beam with good condition among the pre-allocated beams, the UE may fallback to RACH procedure to complete the RACH-less HO. Therefore, more frequent HO failure can be avoided when RACH-less HO with beam resource is performed.

2. Pre-Allocated SRS Resource for HO and/or SCG Addition

Figure 13:
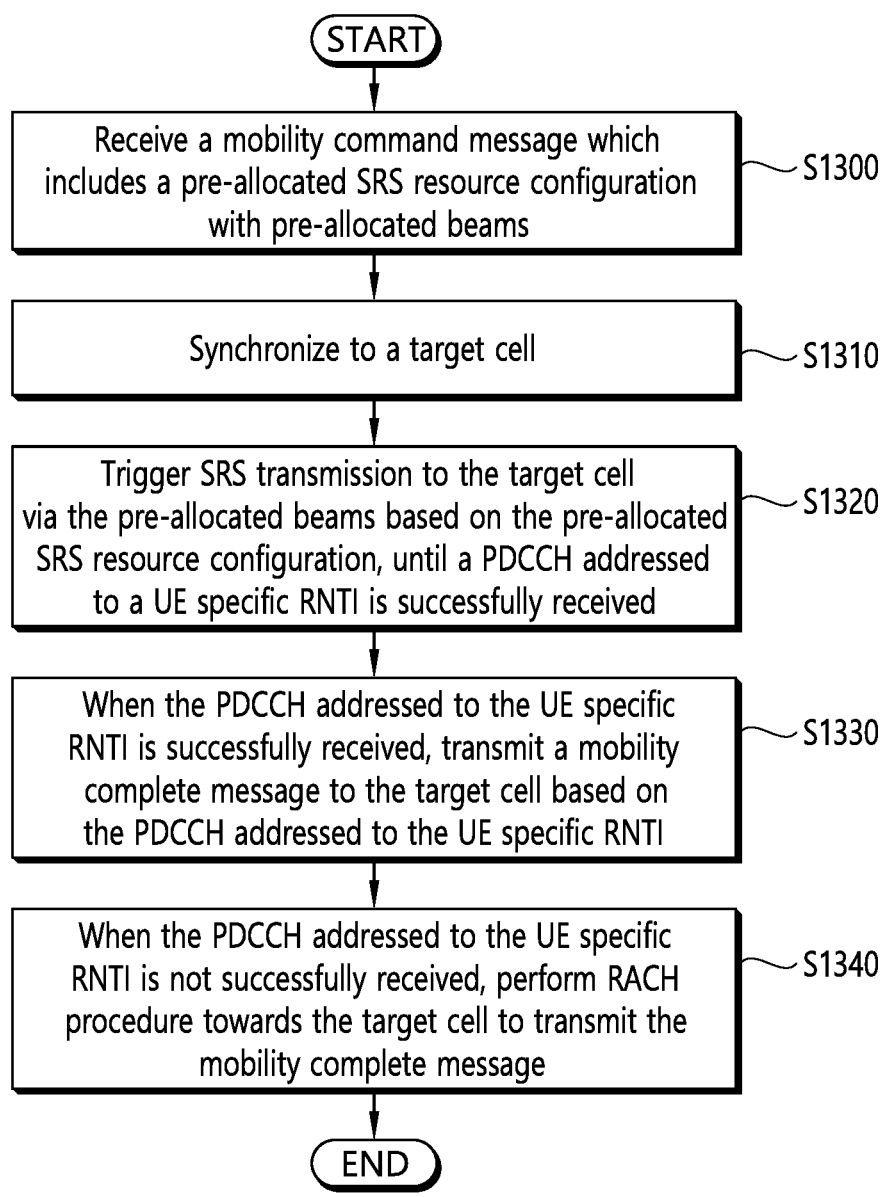
FIG. 13 shows a method for performing synchronous reconfiguration (e.g. PCell change (i.e. HO) and/or SCG reconfiguration) according to another embodiment of the present invention.

FIG. 13 shows a method for performing synchronous reconfiguration (e.g. PCell change (i.e. HO) and/or SCG reconfiguration) according to another embodiment of the present invention.

In step S1300, the UE receives a mobility command message which includes a pre-allocated SRS resource configuration with pre-allocated beams. The mobility command message may be for HO and/or SCG reconfiguration. The mobility command message may indicate RACH-less HO, i.e. RACH-skip. The mobility command message may be generated by the target gNB. The pre-allocated beams may be associated with one or more SS/PBCH blocks and/or one or more CSI-RSs transmitted by the target gNB.

In step S1310, the UE synchronizes to a target cell. The UE may synchronize to the target cell based on the mobility command message.

In step S1320, the UE triggers SRS transmission to the target cell via the pre-allocated beams based on the pre-allocated SRS resource configuration, until a PDCCH addressed to a UE specific RNTI is successfully received. The UE may trigger SRS transmission at one or more occasions with one or more beams among the pre-allocated beams to the target gNB based on the mobility command message, until the successful reception of a PDCCH transmission addressed to a UE specific RNTI (e.g. C-RNTI). The UE may select the one or more beams among the pre-allocated beams based on quality of the pre-allocated beams. The triggered SRS may be periodically transmitted every occasion with the one or more beams beam by switching the pre-allocated beam. The UE may adjust and/or increase transmission power of SRS transmission in the next occasion after one SRS is transmitted.

In step S1330, when the PDCCH addressed to the UE specific RNTI is successfully received, the UE transmits a mobility complete message to the target cell based on the PDCCH addressed to the UE specific RNTI. That is, the UE may transmit a MAC PDU including the mobility complete message to the target gNB via PUSCH based on the received PDCCH addressed to the UE specific RNTI. The PDCCH may indicate UL grant including a beam index used for transmission of the MAC PDU.

In step S1340, when the PDCCH addressed to the UE specific RNTI is not successfully received until a timer expires and/or the maximum number of SRS transmissions is reached, the UE performs RACH procedure towards the target cell to transmit the mobility complete message. In the RACH procedure, the UE may transmit a RACH preamble with a beam and then transmits the MAC PDU including the mobility complete message upon receiving a random access response in response to the RACH preamble. The timer may start when the mobility command message is received.

According to embodiment of the present invention shown in FIG. 13, when the pre-allocated SRS configuration is provided with pre-allocated beams, and when synchronous reconfiguration procedure without RACH procedure is performed, the synchronous reconfiguration procedure can be completed with one or more beams among the pre-allocated beams with good condition. If there are no beam with good condition among the pre-allocated beams, the UE may fallback to RACH procedure to complete the synchronous reconfiguration procedure. Therefore, more frequent failure can be avoided when the synchronous reconfiguration procedure without RACH procedure with beam resource is performed.

Figure 14:
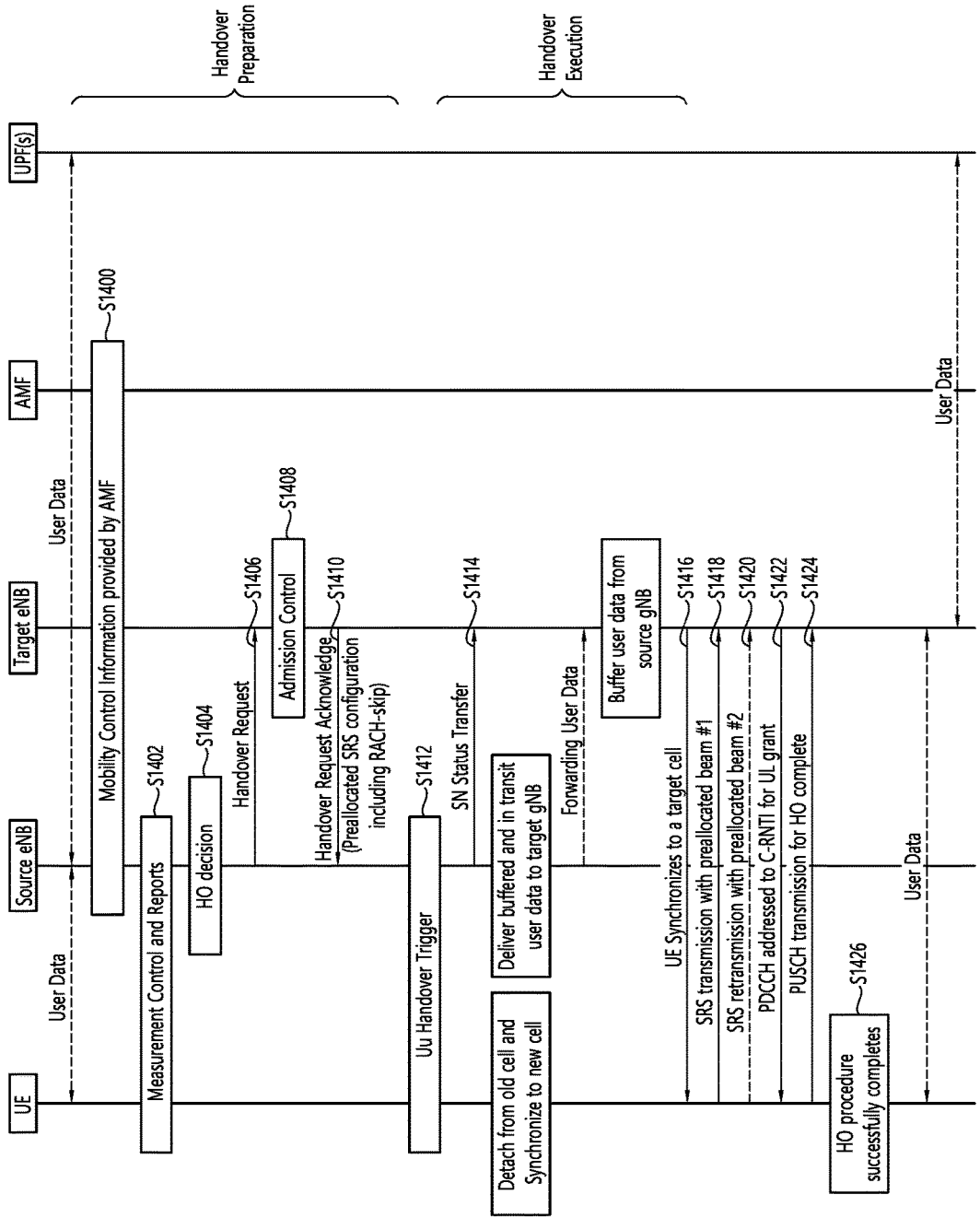
FIG. 14 shows a method for performing a HO procedure according to another embodiment of the present invention.

FIG. 14 shows a method for performing a HO procedure according to another embodiment of the present invention.

Step S1400: The UE context within the source gNB contains information regarding roaming and access restrictions which were provided either at connection establishment or at the last TA update.

Step S1402: The source gNB configures the UE measurement procedures and the UE reports according to the measurement configuration. The RRM configuration can include both beam measurement information (for layer 3 mobility) associated to SS/PBCH block(s) and CSI-RS(s) for the reported cell if both types of measurements are available.

Step S1404: The source gNB decides to HO the UE, based on MEASUREMENT REPORT and RRM information.

Step S1406: The source gNB issues a HANDOVER REQUEST message to the target gNB passing a transparent RRC container with necessary information to prepare the HO at the target side. The information includes at least the target cell ID, KgNB*, the C-RNTI of the UE in the source gNB, RRM-configuration including UE inactive time, basic AS-configuration including antenna Info and DL Carrier Frequency, the UE capabilities for different RATs, and can include the UE reported measurement information including beam-related information if available. Also, if CA is configured, the RRM configuration can include the list of best cells on each frequency for which measurement information is available.

Step S1408: Admission control may be performed by the target gNB.

Step S1410: The target gNB prepares the HO with L1/L2 and sends the HANDOVER REQUEST ACKNOWLEDGE message to the source gNB. The HANDOVER REQUEST ACKNOWLEDGE message includes a transparent container to be sent to the UE as an RRC message to perform the HO.

Step S1412: The source gNB triggers the Uu HO and sends the Handover Command message to the UE. The Handover Command message carries the information required to access the target cell, which includes at least the target cell ID, the new C-RNTI, the target gNB security algorithm identifiers for the selected security algorithms, can include a set of dedicated RACH resources, the association between RACH resources and SS blocks, the association between RACH resources and UE-specific CSI-RS configuration(s), common RACH resources, and target gNB SIBs, etc.

In addition, the Handover Command message may include information on RACH-less HO, i.e. RACH-skip, and pre-allocated SRS configuration including multiple beams. The multiple beams may be associated with multiple SS/PBCH blocks and/or multiple CSI-RSs transmitted by the target gNB. The pre-allocated SRS configuration may also include a quality threshold, UL SRS scheduling interval ul-SchedInterval, starting subframe/slot ul-StartSubframe of the pre-allocated SRS, a timer value and the maximum number of SRS transmissions. Those parameters in the pre-allocated SRS configuration may determine one or more SRS occasions where UE can transmit SRS with pre-allocated beams.

The pre-allocated SRS configuration may include the beam transmission pattern across multiple SRS occasions. For example, beam transmission pattern may indicate which beam(s) is used and/or a candidate(s) in different UL SRS scheduling intervals or different subframes/slots where pre-allocated SRS is configured.

Step S1414: The source gNB sends the SN STATUS TRANSFER message to the target gNB.

Step S1416: The UE synchronizes to the target cell.

Step S1418: If the Handover Command message includes RACH-skip, the UE transmits the pre-allocated SRS with one or more pre-allocated beams for HO completion.

The pre-allocated SRS configuration may allocate pre-allocated beams together with a quality threshold to use the pre-allocated beams. When the pre-allocated beams are provided, they may be prioritized by the UE and the UE shall not switch to other beams than the pre-allocated beams as long as the quality threshold of the pre-allocated beams is met. Namely, if pre-allocated beams are provided and the quality of one or more beam among the pre-allocated beams is above the quality threshold, the UE may select the one or more beam among the pre-allocated beams above the quality threshold. And then, the UE may transmit SRS via SRS occasion with the selected beam(s) based on the pre-allocated SRS configuration.

Step S1420: If SRS transmission is not acknowledged and/or if a PDCCH addressed to a UE specific RNTI is not received before the timer expires and/or the maximum number of SRS transmissions is reached, the UE may select another beam(s) among the pre-allocated beams of which quality is above the quality threshold based on the beam transmission pattern. And then, the UE may transmit SRS via next SRS occasion with the selected beam(s) based on the pre-allocated SRS configuration.

For example, the beam transmission pattern may indicate beam index #1 and #11 at the first SRS occasion while beam index #2 and #12 at the second SRS occasion. The UE may select one or two of beam index #1 and #11 at the first SRS occasion based on the qualities of those beams in step S1418. Therefore, the UE may transmit SRS with pre-allocated beam #1 and #11 at the first SRS occasion. Furthermore, the UE may select one or two of beam index #2 and #12 at the second SRS occasion based on the qualities of those beams in step S1420. Therefore, the UE may transmit SRS with pre-allocated beam #2 and #12 at the second SRS occasion. Thus, the UE may switch selected beam(s) whenever the UE performs SRS transmission.

For another example, the beam transmission pattern may indicate beam index #1 and #11 at the first set of SRS occasions while beam index #2 and #12 at the second set of SRS occasions. The UE may select one or two of beam index #1 and #11 at the first set of SRS occasions based on the qualities of those beams in step S1418. Therefore, the UE may transmit SRS with pre-allocated beam #1 and #11 at the first set of SRS occasions. Furthermore, the UE may select one or two of beam index #2 and #12 at the second set of SRS occasions based on the qualities of those beams in step S1420. Therefore, the UE may transmit SRS with pre-allocated beam #2 and #12 at the second set of SRS occasions. Thus, the UE may switch selected beam(s) after the UE performs N number of SRS transmissions.

If the pre-allocated beams are provided in the Handover Command message but there is no pre-allocated beam of which quality is above the quality threshold, or if the pre-allocated SRS configuration is not provided in the Handover Command message, or if a PDCCH transmission addressed to a UE specific RNTI is not received until a timer expires or the maximum number of SRS transmissions is reached, the UE initiates a random access procedure. In this random access procedure, UE may select a beam of which quality is good, based on configuration received from system information of the target cell and/or RACH configuration received from the Handover Command message. Then, the UE may transmit a preamble with the selected beam which is either one of the pre-allocated beams or one of the other beams. Upon receiving a random access response to the preamble, the UE may transmit a MAC PDU including the Handover Complete message via PUSCH as a message 3 in the random access procedure.

Alternatively, if the pre-allocated beams are provided in the Handover Command message but there is no pre-allocated beam of which quality is above the quality threshold, or if pre-allocated SRS configuration not including the pre-allocated beams is provided in the Handover Command message, the UE may select a beam of which quality is good and then transmit SRS with the selected beam which is either one of the pre-allocated beams or one of the other beams.

Step S1422: The UE receives the PDCCH addressed to the UE-specific RNTI (e.g. C-RNTI) for UL grant.

Step S1424: The UE transmits the Handover Complete message to the target gNB via the UL grant for HO completion.

That is, if a PDCCH addressed to a UE specific RNTI is successfully received, the UE may transmit a MAC PDU including the Handover Complete message to the target gNB via PUSCH based on the received PDCCH addressed to the UE specific RNTI. The PDCCH may indicate UL grant including a beam index used for transmission of the MAC PDU. If the PDCCH addressed to the UE specific RNTI is successfully received, the UE may release the pre-allocated SRS configuration, so that UE stops SRS transmissions based on the pre-allocated SRS configuration. Afterwards, if the Handover Command messages includes normal SRS configuration, when the pre-allocated SRS configuration is released and the Handover procedure is successfully completed, the UE may apply the normal SRS configuration.

If SRS transmission has been not acknowledged and/or if a PDCCH transmission addressed to a UE specific RNTI has been not received and if the timer expires and/or the maximum number of SRS transmissions is reached, the UE may release the pre-allocated SRS configuration and trigger RACH procedure to transmit the MAC PDU including the Handover complete message.

Step S1426: The UE considers that the HO to the target cell is successfully completed, if an acknowledgment is received. The successful reception of a PDCCH addressed to a UE-specific RNTI (e.g. C-RNTI) may be considered as reception of the acknowledgment. Or, the successful reception of a particular MAC CE (e.g. UE contention resolution identity MAC CE) on the PDSCH indicated by a PDCCH addressed to a UE specific RNTI may be considered as reception of the acknowledgment. If an acknowledgment is not received from the target cell until the timer expires and/or the maximum number of SRS transmissions is reached, the UE may consider that the mobility to the target cell is unsuccessfully completed. Then, the UE may trigger RRC connection re-establishment procedure.

Afterwards, the target gNB sends a PATH SWITCH REQUEST message to AMF to trigger 5GC to switch the DL data path towards the target gNB and to establish an NG-C interface instance towards the target gNB. 5GC switches the DL data path towards the target gNB. The AMF confirms the PATH SWITCH REQUEST message with the PATH SWITCH REQUEST ACKNOWLEDGE message. By sending the UE CONTEXT RELEASE message, the target gNB informs the source gNB about the success of HO and triggers the release of resources by the source gNB. The target gNB sends this message after the PATH SWITCH REQUEST ACKNOWLEDGE message is received from the AMF. Upon reception of the UE CONTEXT RELEASE message, the source gNB can release radio and C-plane related resources associated to the UE context. Any ongoing data forwarding may continue.

According to embodiment of the present invention shown in FIG. 14, when the pre-allocated SRS configuration is provided with pre-allocated beams, and when RACH-less HO is performed, the RACH-less HO can be completed with one or more beams among the pre-allocated beams with good condition. If there are no beam with good condition among the pre-allocated beams, the UE may fallback to RACH procedure to complete the RACH-less HO. Therefore, more frequent HO failure can be avoided when RACH-less HO with beam resource is performed.

Figure 15:
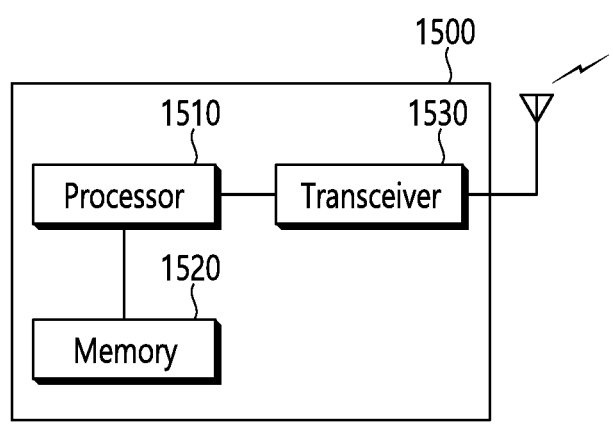
FIG. 15 shows a UE to implement an embodiment of the present invention.

FIG. 15 shows a UE to implement an embodiment of the present invention. The present invention described above for UE side may be applied to this embodiment.

A UE 1500 includes a processor 1510, a memory 1520 and a transceiver 1530. The processor 1510 may be configured to implement proposed functions, procedures and/or methods described in this description. Layers of the radio interface protocol may be implemented in the processor 1510.

Specifically, the processor 1510 is configured to control the transceiver 1530 to receive a mobility command message which includes information on a pre-allocated UL resource for UL transmission with pre-allocated beams. The processor 1510 is configured to control the transceiver 1530 to synchronize to a target cell. The processor 1510 is configured to control the transceiver 1530 to perform the UL transmission to the target cell via the pre-allocated beams based on the pre-allocated UL resource for UL transmission to transmit a mobility complete message via a UL grant.

The information on the pre-allocated UL resource may be a pre-allocated UL grant, and the UL transmission may be a PUSCH transmission. In this case, the pre-allocated UL resource may be UL resource for the PUSCH transmission which is pre-allocated based on the pre-allocated UL grant.

The processor 1510 is configured to determine that a quality of the pre-allocated beams meets the criterion. The criterion may be indicated by the target cell. In this case, the processor 1510 may be configured to control the transceiver 1530 to perform initial PUSCH transmission and/or a PUSCH retransmission for a MAC PDU including the mobility complete message to the target cell via at least one beam among the pre-allocated beams based on the pre-allocated UL grant in response to the mobility command message. The processor 1510 may be configured to control the transceiver 1530 to perform PUSCH retransmission of the MAC PDU including the mobility complete message to the target cell via another beam among the pre-allocated beams based on the pre-allocated UL grant, until an acknowledgment is received and/or the maximum number of retransmissions is reached.

When the processor 1510 determines that there is no pre-allocated beam of which quality meets the criterion, the processor 1510 may be configured to control the transceiver 1530 to perform a random access procedure towards the target cell. In the random access procedure, the processor 1510 may be configured to control the transceiver 1530 to may transmit a RACH preamble with a beam and then (re-)transmit the MAC PDU upon receiving a random access in response to the RACH preamble.

The processor 1510 may be configured to consider that a mobility to the target cell is successfully completed when an acknowledgement is received from the target cell. The acknowledgement may be a PDCCH addressed to a UE-specific RNTI (e.g. C-RNTI). That is, the successful reception of a PDCCH transmission addressed to a UE specific RNTI may be considered as reception of the acknowledgment.

The processor 1510 may be configured to consider that a mobility to the target cell is unsuccessfully completed when an acknowledgement is not received from the target cell until a timer expires and/or a maximum number of retransmission is reached. In this case, the processor 1510 may be configured to release the pre-allocated UL resource, and trigger random access procedure and/or RRC connection resume procedure and/or RRC connection reestablishment procedure. Alternatively, the processor 1510 may be configured to control the transceiver 1530 to perform retransmission of the MAC PDU to the target cell via at least one beam which does not belong to the pre-allocated beams. The processor 1510 may be configured to start a timer when the mobility command message is received.

Alternatively, the information on the pre-allocated UL resource may be a pre-allocated SRS resource configuration, and the UL transmission may be an SRS transmission. In this case, the pre-allocated UL resource may be UL resource for the SRS transmission which is pre-allocated based on the pre-allocated SRS resource configuration.

The SRS transmission may be performed until a PDCCH addressed to a UE-specific RNTI is successfully received. That is, the processor 1510 may be configured to control the transceiver 1530 to trigger SRS transmission to the target cell with the pre-allocated beams at one or more occasions based on the mobility command message, until the successful reception of the PDCCH addressed to the UE-specific RNTI. When the PDCCH addressed to the UE-specific RNTI is successfully received, the processor 1510 may be configured to control the transceiver 1530 to transmit a MAC PDU including the mobility complete message to the target cell via a PUSCH based on the PDCCH addressed to the UE-specific RNTI. When the PDCCH addressed to the UE-specific RNTI is not successfully received until a timer expires and/or a maximum number of SRS transmissions is reached, the processor 1510 may be configured to control the transceiver 1530 to perform a random access procedure towards the target cell to transmit the mobility complete message. In the random access procedure, the processor 1510 may be configured to control the transceiver 1530 to transmit a RACH preamble with a beam and then (re-)transmit the MAC PDU upon receiving a random access in response to the RACH preamble.

The memory 1520 is operatively coupled with the processor 1510 and stores a variety of information to operate the processor 1510. The transceiver 1530 is operatively coupled with the processor 1510, and transmits and/or receives a radio signal.

The processor 1510 may include application-specific integrated circuit (ASIC), other chipset, logic circuit and/or data processing device. The memory 1520 may include read-only memory (ROM), random access memory (RAM), flash memory, memory card, storage medium and/or other storage device. The transceiver 1530 may include baseband circuitry to process radio frequency signals. When the embodiments are implemented in software, the techniques described herein can be implemented with modules (e.g., procedures, functions, and so on) that perform the functions described herein. The modules can be stored in the memory 1520 and executed by the processor 1510. The memory 1520 can be implemented within the processor 1510 or external to the processor 1510 in which case those can be communicatively coupled to the processor 1510 via various means as is known in the art.

According to embodiment of the present invention shown in FIG. 15, when UL resource for UL transmission, i.e. PUSCH transmission and/or SRS transmission, is pre-configured with pre-allocated beams, and when mobility procedure without RACH procedure is performed, the mobility procedure can be completed with one or more beams among the pre-allocated beams with good condition. If there are no beam with good condition among the pre-allocated beams, the UE may fallback to RACH procedure to complete the mobility procedure. Therefore, more frequent mobility failure can be avoided when the mobility procedure without RACH procedure with beam resource is performed.

Figure 16:
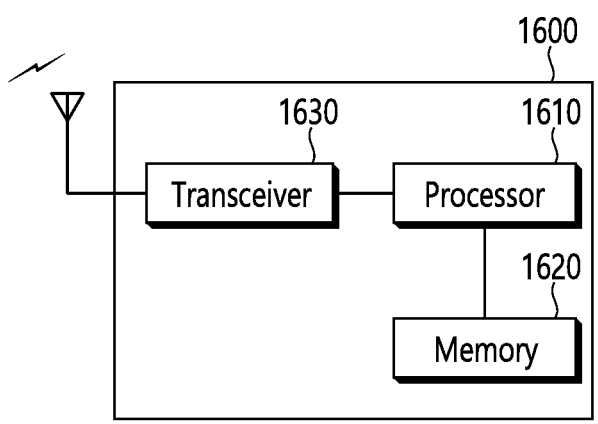
FIG. 16 shows a BS to implement an embodiment of the present invention.

FIG. 16 shows a BS to implement an embodiment of the present invention. The present invention described above for BS side may be applied to this embodiment. The BS may be a target gNB in the description above.

A BS 1600 includes a processor 1610, a memory 1620 and a transceiver 1630. The processor 1610 may be configured to implement proposed functions, procedures and/or methods described in this description. Layers of the radio interface protocol may be implemented in the processor 1610.

Specifically, the processor 1610 is configured to control the transceiver 1630 to transmit information on a pre-allocated UL resource for UL transmission with pre-allocated beams to the source gNB. The information on the pre-allocated UL resource may be a pre-allocated UL grant, and the UL transmission may be a PUSCH transmission. In this case, the pre-allocated UL resource may be UL resource for the PUSCH transmission which is pre-allocated based on the pre-allocated UL grant. Alternatively, the information on the pre-allocated UL resource may be a pre-allocated SRS resource configuration, and the UL transmission may be an SRS transmission. In this case, the pre-allocated UL resource may be UL resource for the SRS transmission which is pre-allocated based on the pre-allocated SRS resource configuration.

The processor 1610 may be configured to control the transceiver 1630 to receive initial PUSCH transmission and/or a PUSCH retransmission for a MAC PDU including the mobility complete message from the UE via at least one beam among the pre-allocated beams based on the pre-allocated UL grant in response to the mobility command message. The processor 1610 may be configured to control the transceiver 1630 to transmit an acknowledgement for the initial PUSCH transmission and/or a PUSCH retransmission for the MAC PDU including the mobility complete message. The acknowledgement may be PDCCH addressed to the UE-specific RNTI. The processor 1610 may be configured to control the transceiver 1630 to receive PUSCH retransmission of the MAC PDU including the mobility complete message from the UE via another beam among the pre-allocated beams based on the pre-allocated UL grant.

The processor 1610 may be configured to control the transceiver 1630 to perform a random access procedure with the UE. In the random access procedure, the processor 1610 may be configured to control the transceiver 1630 to receive a RACH preamble with a beam from the UE, and to (re-)receive the MAC PDU upon transmitting a random access response in response to the RACH preamble.

The processor 1610 may be configured to control the transceiver 1630 to receive SRS. The processor 1610 may be configured to control the transceiver 1630 to transmit an acknowledgement for SRS transmission. The acknowledgement may be PDCCH addressed to the UE-specific RNTI.

The memory 1620 is operatively coupled with the processor 1610 and stores a variety of information to operate the processor 1610. The transceiver 1630 is operatively coupled with the processor 1610, and transmits and/or receives a radio signal.

The processor 1610 may include ASIC, other chipset, logic circuit and/or data processing device. The memory 1620 may include ROM, RAM, flash memory, memory card, storage medium and/or other storage device. The transceiver 1630 may include baseband circuitry to process radio frequency signals. When the embodiments are implemented in software, the techniques described herein can be implemented with modules (e.g., procedures, functions, and so on) that perform the functions described herein. The modules can be stored in the memory 1620 and executed by the processor 1610. The memory 1620 can be implemented within the processor 1610 or external to the processor 1610 in which case those can be communicatively coupled to the processor 1610 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What is claimed is:

1. A method performed by a user equipment (UE) operating in a wireless communication system, the method comprising:
receiving, from a source base station, a measurement configuration;
reporting, to the source base station, measurement results according to the measurement configuration;
receiving, from the source base station, a mobility control information message generated by a target base station,
wherein the mobility control information message includes a rach-Skip field informing the UE that a random access procedure is to be skipped,
wherein the mobility control information message includes a pre-allocated uplink (UL) grant configuration including i) information on one or more pre-allocated beams and ii) information on a quality threshold, and
wherein the one or more pre-allocated beams are associated with one or more synchronization signal (SS) blocks or one or more channel state information (CSI) reference signals (RSs) transmitted by the target base station;
synchronizing to a target cell served by the target base station based on the mobility control information message;
based on a quality of at least one of the one or more pre-allocated beams meeting the quality threshold, performing an UL transmission to the target base station via the at least one pre-allocated beam based on the pre-allocated UL grant configuration, without performing the random access procedure with the target base station based on the rach-Skip field informing the UE that the random access procedure is to be skipped; and
based on none of the one or more pre-allocated beams meeting the quality threshold, performing the random access procedure with the target base station.

2. The method of claim 1, wherein the UL transmission includes a mobility complete message in response to the reception of the mobility control information message.

3. The method of claim 1, wherein the method further comprises:
retransmitting the UL transmission to the target base station based on the pre-allocated UL grant configuration until an acknowledgement is received from the target base station or a maximum number of retransmissions is reached.

4. The method of claim 3, wherein the retransmission is performed via beams other than the at least one beam meeting the threshold.

5. The method of claim 1, wherein the method further comprises:
considering mobility to the target cell successfully completed based on a reception of an acknowledgement from the target base station.

6. The method of claim 5, wherein a successful reception of a physical downlink control channel (PDCCH) transmission addressed to a UE-specific radio network temporary identity (RNTI) is considered as the reception of the acknowledgement.

7. The method of claim 1, wherein the method further comprises:
considering mobility to the target cell unsuccessfully completed based on an acknowledgement not being received from the target base station before a timer expires or a maximum number of retransmissions is reached.

8. The method of claim 7, wherein the method further comprises:
releasing the pre-allocated UL grant configuration; and
triggering a radio resource control (RRC) connection reestablishment procedure.

9. The method of claim 1, wherein the mobility control information message includes a pre-allocated sounding reference signal (SRS) configuration including information on the one or more pre-allocated beams, and
wherein the UL transmission includes an SRS transmission.

10. The method of claim 9, wherein the SRS transmission is performed until a PDCCH addressed to a UE-specific RNTI is successfully received.

11. The method of claim 10, wherein the method further comprises:
transmitting a mobility complete message to the target base station based on successful reception of the PDCCH addressed to the UE-specific RNTI.

12. The method of claim 10, wherein the method further comprises:
performing the random access procedure with the target base station based on the PDCCH addressed to the UE-specific RNTI not being successfully received before a timer expires or a maximum number of SRS transmissions is reached.

13. The method of claim 1, wherein the UE is in communication with at least one of a mobile device, a network, and/or autonomous vehicles other than the UE.

14. A user equipment (UE) configured for operating in a wireless communication system, the UE comprising:
at least one transceiver;
at least one processor; and
at least one memory operably connectable to the at least one processor and storing instructions that, based on being executed by the at least one processor, perform operations comprising:
receiving, from a source base station using the at least one transceiver, a measurement configuration;
reporting, to the source base station using the at least one transceiver, measurement results according to the measurement configuration;
receiving, from the source base station using the at least one transceiver, a mobility control information message generated by a target base station,
wherein the mobility control information message includes a rach-Skip field informing the processor that a random access procedure is to be skipped,
wherein the mobility control information message includes a pre-allocated uplink (UL) grant configuration including i) information on one or more pre-allocated beams and ii) information on a quality threshold, and
wherein the one or more pre-allocated beams are associated with one or more synchronization signal (SS) blocks or one or more channel state information (CSI) reference signals (RSs) transmitted by the target base station;
synchronizing to a target cell served by the target base station based on the mobility control information message;
based on a quality of at least one of the one or more pre-allocated beams meeting the quality threshold, performing, using the at least one transceiver, an UL transmission to the target base station via the at least one pre-allocated beams based on the pre-allocated UL grant configuration, without performing the random access procedure with the target base station based on the rach-Skip field informing the processor that the random access procedure is to be skipped; and
based on none of the one or more pre-allocated beams meeting the quality threshold, performing, using the at least one transceiver, the random access procedure with the target base station.

15. A processing apparatus configured to operate a wireless device in a wireless communication system, the processing apparatus comprising:
at least one processor; and
at least one memory operably connectable to the at least one processor, wherein the at least one processor is configured to perform operations comprising:
obtaining a measurement configuration;
generating measurement results according to the measurement configuration;
obtaining a mobility control information message generated by a target base station,
wherein the mobility control information message includes a rach-Skip field informing the processor that a random access procedure is to be skipped,
wherein the mobility control information message includes a pre-allocated uplink (UL) grant configuration including i) information on one or more pre-allocated beams and ii) information on a quality threshold, and
wherein the one or more pre-allocated beams are associated with one or more synchronization signal (SS) blocks or one or more channel state information (CSI) reference signals (RSs) transmitted by the target base station;
synchronizing to a target cell served by the target base station based on the mobility control information message;
based on a quality of at least one of the one or more pre-allocated beams meeting the quality threshold, controlling the wireless device to perform an UL transmission to the target base station via the at least one pre-allocated beam based on the pre-allocated UL grant configuration, without performing the random access procedure with the target base station based on the rach-Skip field informing the processor that the random access procedure is to be skipped; and based on none of the one or more pre-allocated beams meeting the quality threshold, controlling the wireless device to perform the random access procedure with the target base station.

\* \* \* \* \*